US009954597B2

(12) United States Patent
Boss et al.

(10) Patent No.: US 9,954,597 B2
(45) Date of Patent: *Apr. 24, 2018

(54) DEPLOYMENT CRITERIA FOR UNMANNED AERIAL VEHICLES TO IMPROVE CELLULAR PHONE COMMUNICATIONS

(71) Applicant: International Business Machines Corporation, Armonk, NY (US)

(72) Inventors: Gregory J. Boss, Saginaw, MI (US); Rick A. Hamilton, II, Charlottesville, VA (US); Maharaj Mukherjee, Poughkeepsie, NY (US); Monimala Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,351

(22) Filed: Mar. 8, 2016

(65) Prior Publication Data
US 2016/0191142 A1 Jun. 30, 2016

Related U.S. Application Data

(63) Continuation of application No. 14/337,598, filed on Jul. 22, 2014, now Pat. No. 9,363,008.

(51) Int. Cl.
*H04W 4/00* (2009.01)
*H04W 40/00* (2009.01)
(Continued)

(52) U.S. Cl.
CPC ..... *H04B 7/18504* (2013.01); *G06Q 30/0201* (2013.01); *H04M 15/68* (2013.01);
(Continued)

(58) Field of Classification Search
CPC ...... H04W 16/00–16/32; H04W 40/20–40/38; H04W 60/00;
(Continued)

(56) References Cited

U.S. PATENT DOCUMENTS 7,142,868 B1 * 11/2006 Broyles ................. H04W 16/00
455/418
7,328,363 B2 2/2008 Mukherjee
(Continued)

FOREIGN PATENT DOCUMENTS

WO WO 2013/030834 A1 3/2013

OTHER PUBLICATIONS

Ackerman, "Boeing Bills Its Massive Hydrogen-Powered Drone as a Flying Cell Tower", dangerroom, http://www.wired.com/dangerroom/2013/04/phantom-eye-2/, Apr. 8, 2013, pp. 8-10.
(Continued)

*Primary Examiner* — San Htun
(74) *Attorney, Agent, or Firm* — Scully, Scott, Murphy & Presser, P.C.; Kurt Groudy, Esq.

(57) ABSTRACT

System, method and computer program product for extending mobile device cellular carrier network coverage using unmanned aerial vehicles (UAVs) equipped with telecommunications devices to act as temporary mobile device cellular network towers. The system and method extends cellular phone coverage of a land-based cellular phone network by: receiving information for determining a predicted or actual increase in aggregate cellular phone usage demand in an area at a determined time; identifying, based on an the predicted or actual increased aggregate cellular phone usage demand for the area, whether there exists a mismatch of existing usage coverage compared with the determined increased aggregate demand for that area; determining, based on an identified mismatch, a plan for sending
(Continued)

signals to and deploying one or more mobile cellular unmanned aerial vehicles (UAV) having telecommunications equipment configured to extend cellular phone network coverage of an existing land-based cellular phone network at the mismatched area.

25 Claims, 16 Drawing Sheets

(51) Int. Cl.

| | |
|---|---|
| *H04B 7/185* | (2006.01) |
| *H04W 84/06* | (2009.01) |
| *H04W 16/00* | (2009.01) |
| *H04M 15/00* | (2006.01) |
| *H04W 16/26* | (2009.01) |
| *H04W 64/00* | (2009.01) |
| *H04W 16/18* | (2009.01) |
| *H04W 24/02* | (2009.01) |
| *G06Q 30/02* | (2012.01) |
| *H04W 28/02* | (2009.01) |
| *H04W 84/00* | (2009.01) |
| *H04W 24/08* | (2009.01) |

(52) U.S. Cl.
CPC ....... *H04M 15/8038* (2013.01); *H04W 16/00* (2013.01); *H04W 16/18* (2013.01); *H04W 16/26* (2013.01); *H04W 24/02* (2013.01); *H04W 28/0289* (2013.01); *H04W 64/006* (2013.01); *H04W 84/06* (2013.01); *H04W 24/08* (2013.01); *H04W 84/005* (2013.01)

(58) Field of Classification Search
CPC . H04W 60/003; H04W 60/006; H04W 84/00; H04W 84/005–84/10; H04W 88/00; H04W 88/08–88/188
See application file for complete search history.

(56) References Cited

U.S. PATENT DOCUMENTS

| | | | | |
|---|---|---|---|---|
| 8,150,611 | B2 | 4/2012 | Mukherjee | |
| 2007/0178930 | A1* | 8/2007 | Xiao | H04W 52/346 |
| | | | | 455/522 |
| 2008/0242301 | A1* | 10/2008 | Osterling | H04W 36/08 |
| | | | | 455/436 |
| 2009/0319654 | A1* | 12/2009 | Gonzalez | H04L 67/322 |
| | | | | 709/224 |
| 2010/0273493 | A1* | 10/2010 | Matsunaga | H04L 41/147 |
| | | | | 455/446 |
| 2010/0273504 | A1* | 10/2010 | Bull | G01S 5/02 |
| | | | | 455/456.1 |
| 2012/0023223 | A1* | 1/2012 | Branch | G06F 9/4856 |
| | | | | 709/224 |
| 2013/0303218 | A1 | 11/2013 | Teller et al. | |

OTHER PUBLICATIONS

Churchill, "Flying Cell Towers", dailywireless.org., http://www.dailywireless.org/2012/03/06/flying-cell-towers/, Mar. 6, 2012, pp. 1-3.

Jones, "Telecom-equipped drones could revolutionize wireless market", azcentral.com; http://www.azcentral.com/business/news/articles/20130424telecom-equipped-drones-could-revolutionize-wireless-market.html, Apr. 27, 2013, pp. 1-5.

Ackerman, Army's Drones Get New Add-Ons: Radars, Self-Landing, Cellular Coverage [Updated], wired.com, http//www.wired.com/2010/10/armys-drones-get-new-add-ons-radars-self-landing-cellular-coverage/, Oct. 26, 2010, pp. 8-10.

* cited by examiner

DEPLOYMENT CRITERIA FOR UNMANNED AERIAL VEHICLES TO IMPROVE CELLULAR PHONE COMMUNICATIONS

FIELD OF INVENTION

The present invention relates generally systems and methods for evaluating and determining the capacity of cellular networks ground based stations, and the tactical deployment and use of telecommunications-equipped unmanned aerial vehicles (UAV) or "drones" to augment the capacities and capabilities of land-based cellular network base stations.

BACKGROUND

Inadequate mobile device cellular phone coverage is the subject of much frustration for many users of cellular/mobile phones. When customers lack sufficient mobile signal strength, customers incur costs in the form of cellular roaming, as well as dissatisfaction with low sound quality and dropped calls. Some technologies, such as CDMA, have the ability to expand and contract cellular coverage area from a fixed tower. The number of customers registered to a particular cell affects tower range, and the signal strength of a customer can vary dramatically when sampled from the same location at different times/days. Other factors can seriously degrade signal strength, including other RF interference, and multi-path interference created by physical obstacles. Zoning laws can create difficulty in building cellular towers, and even when zoning laws are favorable, availing appropriate space at financially advantageous terms can be difficult and time consuming. In other cases, signal strength may be good but capacity remains low. In these situations, customers appear to have good signal strength, but the throughput for data/voice can be limited because of saturation at the cellular tower's back haul link. Many of these problems occur when unplanned events occur that cause more people to visit the same geographic spot (public demonstration, sporting events, city celebration, etc).

SUMMARY

A system, method and computer program product for enabling a mobile cellular carrier network to deploy unmanned aerial vehicles (UAVs) equipped with telecommunications devices to act as temporary mobile device cellular network towers, so as to augment signal strength provide cellular service and/or augment the capacities and capabilities of cellular network ground base stations.

The system, method and computer program product implements functionality for monitoring end users cell phone strengths to determine weak coverage spots, and optimizing when and where a UAV should be dispatched to increase the signal strength or bandwidth to a given area.

The system, method and computer program product provides for increased on-demand cellular coverage and maps coverage to demands for service.

The system, method and computer program product performs a mapping, explicitly or implicitly, of where existing coverage may not meet spatial or temporal demand. Based on need, the system and methods identify locations for optimal UAV placement to mitigate insufficient coverage.

Besides determining when and where to deploy UAVs for coverage, the system and methods determines where people are or where large groups are congregating, and further tracks VIP customers and customers' requests for increased coverages for set durations. To this end, the system and methods implements several predictive methods deploying UAVs in advance of problems to increase cellular coverage in areas where it is predicted that people will converge, in excess of existing cellular capacity.

In one aspect, there is provided a system for extending cellular phone coverage of a land-based cellular phone network. The system comprises: a memory storage device; a computing device implementing a hardware processor coupled to the memory storage device and configured to: receive information for determining a predicted or actual increase in aggregate cellular phone usage demand in an area at a determined time; identify at the hardware processing device, based on an the predicted or actual increased aggregate cellular phone usage demand for the area, whether there exists a mismatch of existing usage coverage compared with the determined increased aggregate demand for that area; determine, based on an identified mismatch, a plan for deploying one or more mobile cellular unmanned aerial vehicle (UAV) having telecommunications equipment configured to extend cellular phone network usage of an existing land-based cellular phone network to the mismatched area; and send, by the computing device, a signal to a facility configured to deploy the one or more mobile cellular UAVs to the mismatched area according to the plan, wherein, responsive to the signal, the one or more mobile cellular UAVs are deployed to the mismatched area to connect with the existing land-based cellular phone network and extend cellular phone usage coverage at the area.

In one aspect, there is provided a method for extending cellular phone coverage of a land-based cellular phone network. The method comprises: receiving, at a hardware processor of a computing device, information for determining a predicted or actual increase in aggregate cellular phone usage demand in an area at a determined time; identifying at the hardware processing device, based on an the predicted or actual increased aggregate cellular phone usage demand for the area, whether there exists a mismatch of existing usage coverage compared with the determined increased aggregate demand for that area; determining, based on an identified mismatch, a plan for deploying one or more mobile cellular unmanned aerial vehicles (UAV) having telecommunications equipment configured to extend cellular phone network usage of an existing land-based cellular phone network to the mismatched area; and sending, by the computing device, a signal to a facility configured to deploy the one or more mobile cellular UAVs to the mismatched area according to the plan, wherein, responsive to the signal, the one or more mobile cellular UAVs are deployed to the mismatched area to connect with and extend cellular phone usage coverage at the area.

A computer program product is provided for performing operations. The computer program product includes a storage medium, the medium not a propagating signal, the medium readable by a processing circuit and storing instructions run by the processing circuit for running a method. The method is the same as listed above.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

Figure 21:
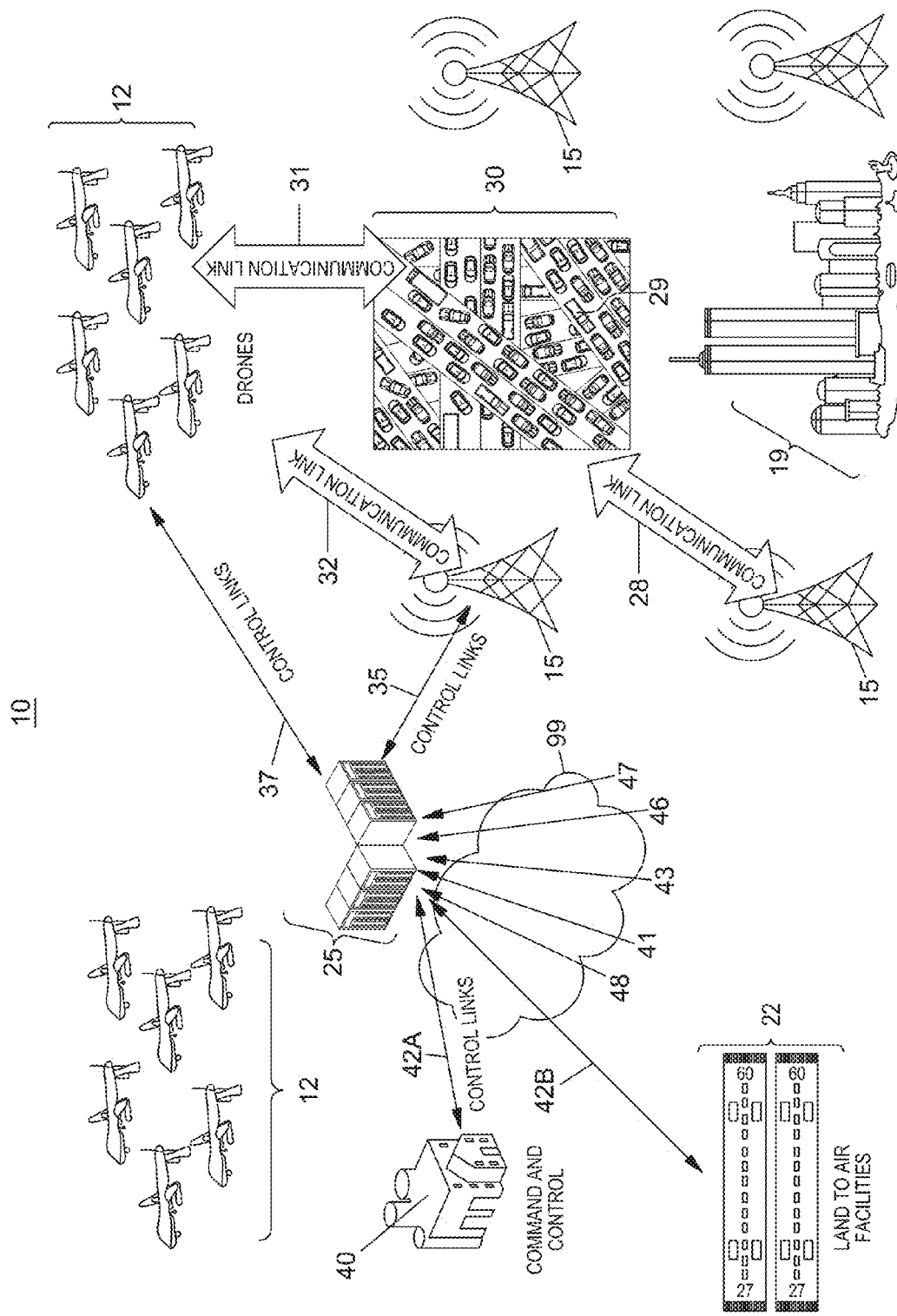
FIG. 21 shows a system for dispatching mobile cellular aerial vehicles from land to air facilities for extending mobile cell phones usage coverage.

FIG. 21 shows a system 10 for determining when and where to dispatch a mobile cellular aerial vehicles 12 (alternately referred to as a "drone", or unmanned aerial vehicle or "UAV") for extending mobile cell phones usage coverage from land to air facilities 22. In one aspect, the system includes: a cellular phone network depicted by one or more base stations 15 associated with network cells. Each base station 15 corresponds to a cellular phone network cell and enables cellular phone communications from mobile devices. In one aspect, base stations 15 enable cellular phone coverage for devices and/or vehicles in defined geographic areas 19.

Types of cellular networks for which UAV's 12 may be deployed to extend mobile phone service coverage according to the methods employed include, but are not limited to: GSM (Global System for Mobile Communications); Universal Mobile Telecommunications System (UMTS); High-Speed Packet Access (HSPA) (e.g., Turbo 3G); Long-Term Evolution (LTE) networks; General Packet Radio Service (GPRS), cdmaOne, CDMA2000, Evolution-Data Optimized (EV-DO), Enhanced Data Rates for GSM Evolution (EDGE), Digital Enhanced Cordless Telecommunications (DECT), Digital AMPS (IS-136/TDMA), and Integrated Digital Enhanced Network (iDEN).

In one embodiment, as shown, communication links 32 are established between drones 12 and the cellular land based towers 15 using the established cellular network protocols and interfaces. The drone(s) are equipped with cell transceiver/receivers and repeaters and function to connect with an existing cellular network. Each drone may carry its own source of power for mobility, as well as the power source for the cell transceiver and repeater, and its capacity would be much less as compared to land based towers 15. Advantageously, the drones are not subject to ground based obstructions that might reflect and refract the signals and even at low power capacity and will provide as good coverage as land based cell towers. Once deployed, the altitude of the UAV flight is expected to comply with ant prevailing local laws. For example, laws may be enacted and enforced to create altitude corridors for each type of UAVs. The cell tower drones can fly as high as 1000 feet to 5 miles—but since they should not interfere with commercial passenger—they may be restricted to only a certain altitude band.

Further, as shown in FIG. 21, just as cellular land based towers 15 receive communications 28 from mobile communication devices, e.g., from devices in a cell coverage area 19 or from vehicles 29 such as located in an area of vehicle traffic 30 to monitor call volumes, according to one aspect, the drones 12 are configured to establish communications via links 31 from the area 19 or from vehicles 29 such as located in an area of traffic 30 to monitor call volumes from that area. Using cell interfaces and protocols that are the same as cellular land based towers 15 and to either a mobile device via communication links 31, or to a mobile tower 15 via communication links 32, a UAV 12 is configured to extend the cell coverage area that would result from a contraction of a cell's coverage area due to large call volumes.

In one embodiment, one or more central server(s) 25 are configured to establish bi-directional control links 35 with cell network base stations 15 and establish bi-directional control links 35 with drones 12 over an air interface. From the call volume data inputs communicated via links 35, 37 etc., the central server(s) monitors and detects aggregate weak cell coverage and creates maps, e.g., "heat" maps of predicted bad or weak coverage areas, where the extensions of coverage may be needed. For example, links 37 from the drones may be analyzed by means of regular feedback from the drones by the central server(s) 25 used to determine whether there exists an unbalance in the load of the drone or other infrastructure. Further, via a wide area network or the Internet 99, control links 42a, 42b are established via network connections between the one or more central servers 25 and a command and control center 40 which performs creating the flight plans (where to fly and position) of drones and the active dispatching of the drone from the one or more land to air facilities 22 based on the monitored and detected aggregate cell coverage as determined from the data input to the central server(s) 25. Via the wide area network, a Virtual Private Network or public network such as the Internet 99, the central servers 25 may also receive data inputs (feeds) 41 from entities referred to as very important persons (i.e., VIPs such as emergency responders, customers with large contracts, etc.), data feeds 43 from social media networks such as geo-tagged tweets, data feeds 46 from weather services and/or traffic departments, e.g., a local department of transportation (DOT), or like entities that report on traffic conditions in an area 30, data feeds 47 from news media reporting on events, and data feeds 48 from an infrastructure or entity providing financial transaction data.

Figure 19:
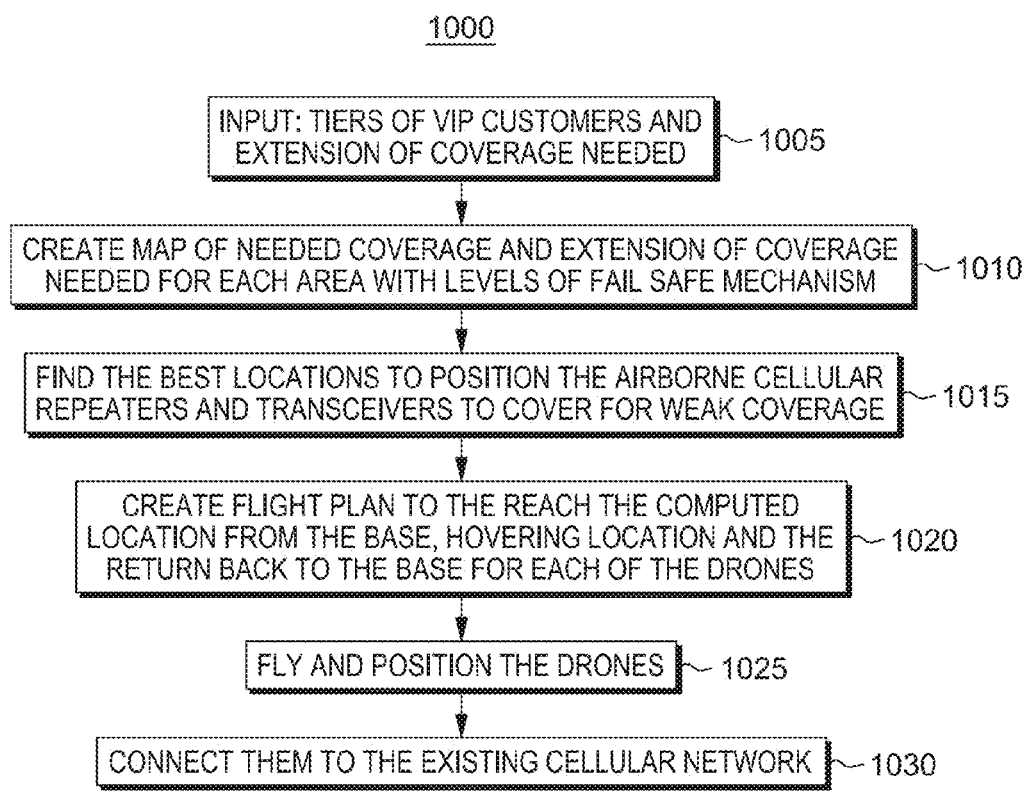
FIG. 19 depicts an example methodology 1000 employed for accommodating additional cellular communications coverage from tiers of requesting VIPs.

FIG. 19 depicts an example methodology 1000 employed by central servers 25 wherein the VIP data feed 41 may include requests for additional cellular communications coverage from tiers of requesting VIPs. At 1005, the central servers 25 receive data from tiers (hierarchies) of VIP Customers (e.g., emergency service, contracting customers, etc.) requesting extension of coverage(s) needed. At 1010, the central servers analyze current/predicted network loads and requested coverage areas to generate a map of needed coverage and extension of coverage needed for each area with levels of fail safe mechanism. A fail safe mechanism is implemented by providing one or more layers of back up coverage by means of drones so that under no plausible circumstances a cell network can be dropped. Then at 1015, the central servers 25 determine the best locations to position the airborne UAVs that are equipped with cellular repeaters and transceivers to cover for the anticipated weak coverage. Then, at 1020, the central servers are configured to create a flight plan for the UAV to reach the computed location from the land-to-air facility (i.e., the hovering location) and the return back to the base for each of the drones. At 1025, the drones are dispatched to fly to their hovering positions and at 1030 are connected to the existing cellular network.

Figure 20:
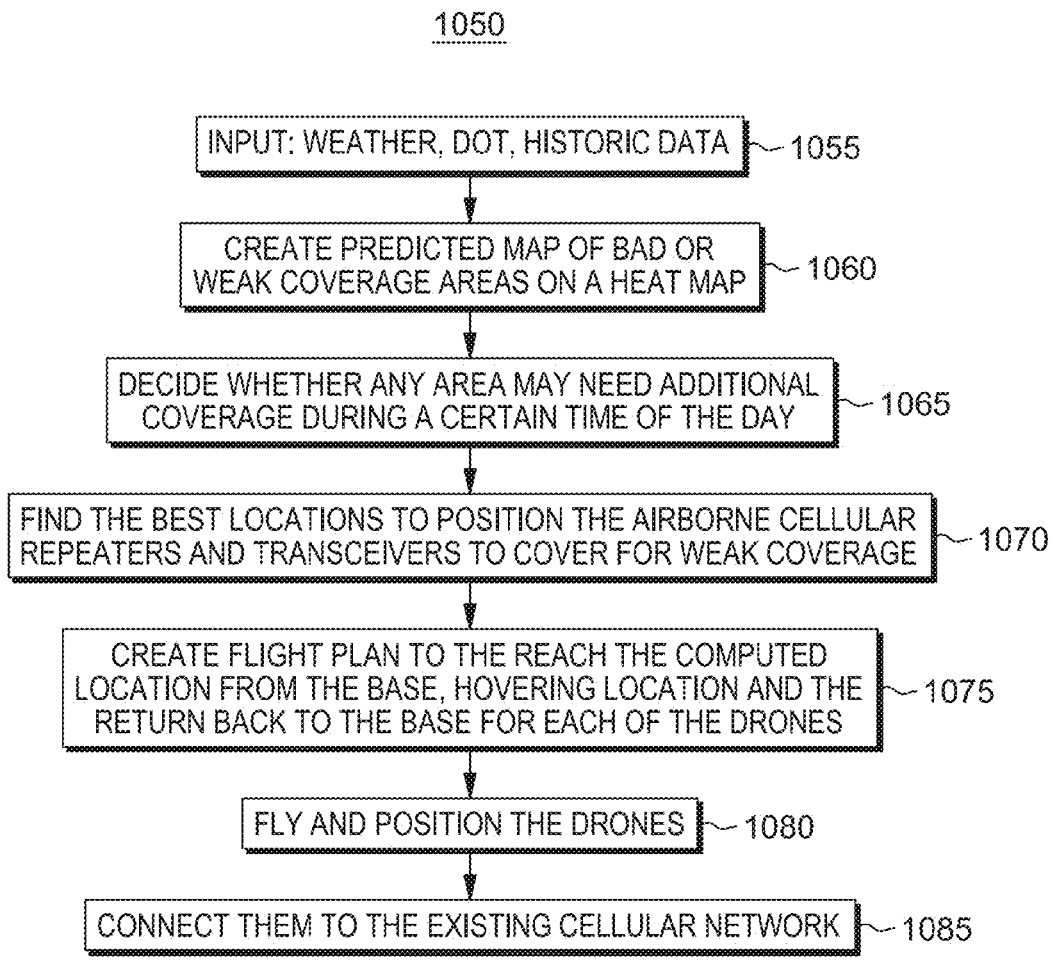
FIG. 20 depicts an example methodology 1050 employed for accommodating additional cellular communications coverage based on weather and/or traffic data.

FIG. 20 similarly depicts an example methodology 1050 employed by central servers 25 wherein at 1055, the servers receive a data feed 46 including data such as weather data of a particular area from a National Weather Service and/or traffic data of that particular area from a local department of transportation. Using this data input at 1055, and with additional historic data of cell coverage loads corresponding to similar traffic/weather conditions maintained by the central servers, the central servers at 1060 analyze the current/predicted network loads and generate a predicted map of bad or weak coverage areas, referred to herein as a "heat" map. Based on the generated heat map, at 1065, the central server is configured to decide whether any area may need additional coverage during a certain time of the day. Then, steps 1070 through 1085 are performed which correspond to steps 1015 to 1030 of FIG. 19. That is, at 1070, the central servers 25 determine the best locations to position the airborne UAVs that are equipped with cellular repeaters and transceivers to cover for the anticipated weak coverage. Then, at 1075, the central servers are configured to create a flight plan for the UAV to reach the computed location from the land-to-air facility (i.e., reach a hovering location) and the return back to the base for each of the drones. At 1080, the drones are dispatched to fly to their hovering positions and at 1085 are connected to the existing cellular network.

The foregoing methods of FIGS. 19 and 20 may be likewise employed by the central servers to dispatch UAVs based on predicted cell phone usage coverage according to further data inputs such as the social media network feeds 43 and the financial data feeds 48, that include data that are analyzed to determine a potential time/place in which cell coverage may be extended by a drone(s) 12.

Referring back to FIG. 21, the central servers 25 may communicate and cooperate with the command and control center to implement methods described in greater detail herein to determine when and where to dispatch a mobile cellular aerial vehicles from land to air facilities. The methods implemented are for: 1) detecting aggregate weak cell coverage; 2) receiving and processing a customer request for increased coverage for a specific time duration; 3) detecting high profile or important customers and move with them (e.g., emergency responders, customers with large contracts, etc); and 4) detecting the convergence, or migration patterns, of large groups. For example, there may be employed one or more of: monitoring a carrier that logs for increased events like "dropped calls"; reading phone users private and public calendars; monitoring a carrier's fixed tower bandwidth and dividing by the number of registered users (e.g., high throughput due to increased users indicates convergence event, whereas higher bandwidth used by a few heavy users could result in not deploying a UAV but performing bandwidth restrictions); and, using geo-tagged tweets.

For the purpose of this disclosure, "dark spots," are referred to herein to indicate a mismatch of coverage to demand. In embodiments, such representations can of course take on varying graphical forms. For example, there is considered a scenario of a morning commute of vehicles into a city. Demand for cellular coverage can move from the suburb towards the city center as traffic flows inward. Demand accordingly varies over time and location, and reverses direction during the evening rush hours. The problem could become more acute with new technologies around self-driving cars, which may further free up drivers to take on additional tasks while commuting. In this case, an on demand drone will move along with the traffic to provide appropriate cellular coverage.

Figure 1:
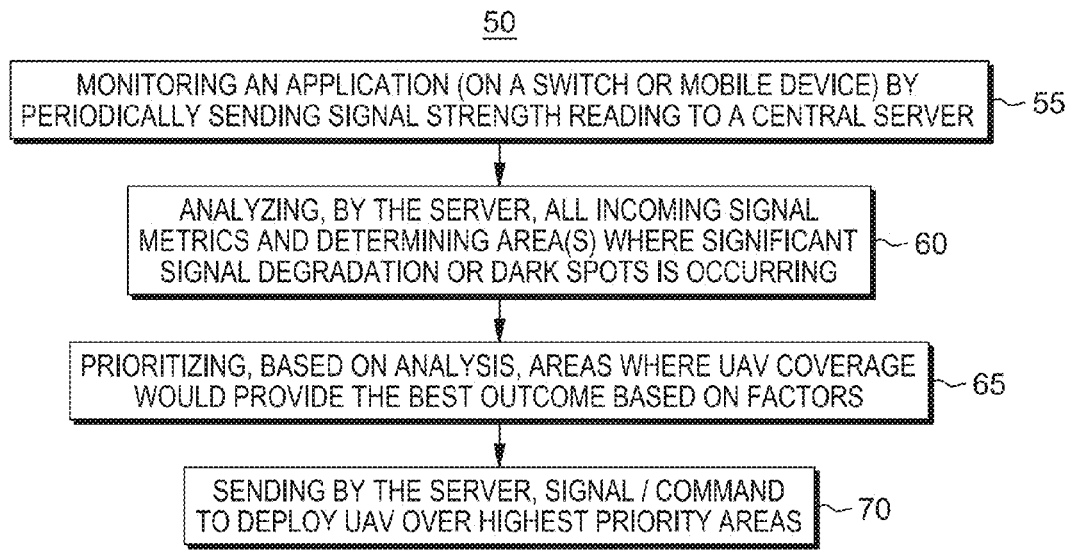
FIG. 1 shows a method 50 to detect aggregate weak cell coverage for determining whether to employ a UAV.

FIG. 1 shows a method 50 to detect aggregate weak cell coverage for determining whether to employ a UAV. This method 50 of FIG. 1 is employed by the central servers 25 (e.g., of a cellular network carrier) for detecting when a large number of collocated people are experiencing suboptimal service for some period of time. Such detection may be accomplished either through the switch or mobile device as current switch technologies have a sophisticated ability to capture information about cell signal, which may be used accordingly. A switch in a mobile network is a device that makes or breaks connection between two or more communication entities and creates communication topologies. The switches are capable of monitoring and reporting the quality and level of communication passing through them. Alternatively, applications may be deployed on a smart phone to capture and send quality information. In either case, this data is used to determine the most effective place for a UAV to be deployed.

As shown in FIG. 1, method 50 employed by the central servers includes a first step 55 of monitoring an application, whether on the switch or mobile device, and periodically or asynchronously sending a signal strength reading to an analysis server. Then, at 60, the central server analyzes all incoming signal metrics and determines areas where significant signal degradation is occurring. At 65, the server prioritizes areas where UAV coverage would provide the best outcome based on a number of factors. These factors may include, but are not limited to: 1. Number of people with potential improved coverage (e.g., Customer Satisfaction/Revenue generation); 2. Amount of data being generated (e.g., Revenue generation); and 3. Location in terms of competitive coverage (e.g., cost savings based on roaming agreements); Finally, at step 70, the server sends signal/command to deploy a telecommunications-capable UAV or drone ("cell tower") over highest priority areas.

Figure 2:
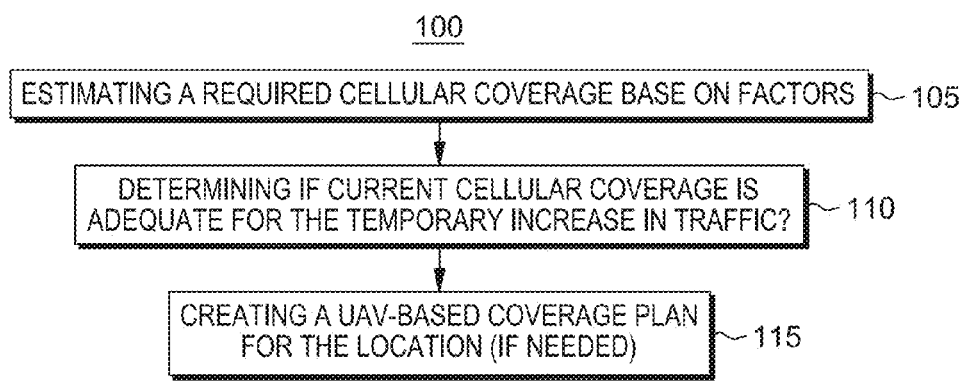
FIG. 2 shows a general method 100 for determining a need to create a UAV-based coverage plan for a location.

In a further aspect, the central servers 25 employ methods for a customer to request increased coverage for a specific time duration. FIG. 2 shows a method 100 for providing by a UAV, responsive to a customer's request for increased coverage for a specific time duration. This method considers situations when, for certain reasons, a specific location may require increased coverage for certain time. Examples include, but are not limited to, conferences in a certain area of a city, or seasonal tourism, e.g., beach goers that flock to a beach for a weekend, or a popular sporting event, etc.

As shown in FIG. 2, the method 100 includes a first step 105 of making an estimate of required cellular coverage. This estimate may be based on publicized events, or based on implicit reservations or stated plans for masses to visit an area, e.g., a beach area for a weekend, or a largely populated event in an area. Then, at 110, considering the current cellular coverage, a determination is made as to whether the existing coverage is adequate for the estimated (temporary) increase in traffic. Then, at 115, using techniques discussed in greater detail below, the method performs creating a UAV-based coverage plan for the location, if determined one is needed.

Figure 3:
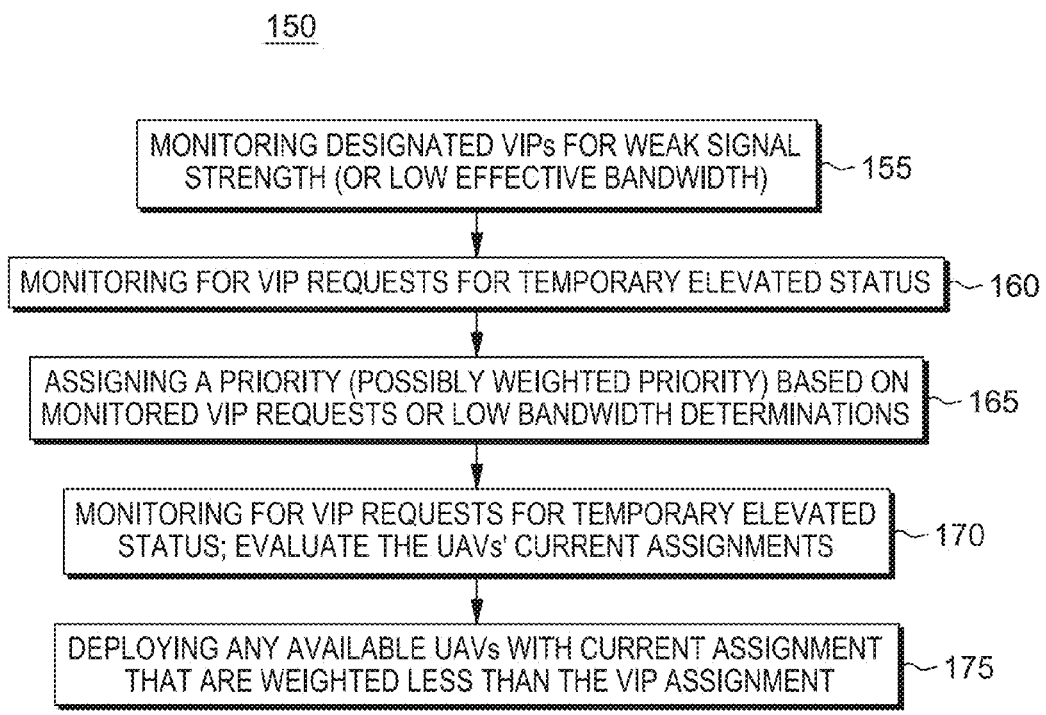
FIG. 3 shows a method for detecting high profile or important customers, and dispatching a UAV cell tower moving with them.

In a further aspect, the central servers 25 employs a method 150 shown in FIG. 3 for detecting high profile or important customers, and dispatch a UAV cell tower moving with them. These high profile or important customers may include, but are not limited to: emergency responders, customers with large contracts, etc. This method considers customers with higher-than-usual needs (e.g. first responders, emergency technicians, or people with premium contracts). This method can also accommodate a tiered category of customers—where a certain group can request superior coverage. In this method, for example, very important customers (i.e., a VIP) may either: 1) make individual requests or 2) the system would actively monitor their signal levels. Upon request by a requestor (e.g., VIP), or detection of poor coverage service, the system could prioritize each VIP—for example, an emergency responder may receive a temporary elevation in priority during emergency scenarios, and which may return to a lower priority after its conclusion. Similarly, individuals may request a temporary VIP status, if willing to pay fees associated with that status, and may provide the predicted usage data—since it is in their interest that additional coverage is provided at an extra charge. To determine who explicitly has such priority, a variety of methods may be employed such as: evaluating, by the system, how many UAVs have lower priority assignments (or are grounded due to lack of need) and determine how many important customers could be covered with a single UAV. For example, if UAV "A" could cover 22 VIPs in Zone 1, and 8 VIPs in Zone 2, then UAV A would be dispatched to Zone 1. In another possible embodiment, the system might prioritize UAV dispatch for purposes of emergency scenarios which outweigh the needs of all other customers.

As shown in FIG. 3, method 150 includes a first step 155 of monitoring the designated VIPs for weak signal strength (or a low effective bandwidth). Further, at 160 there is performed monitoring of VIP requests for temporary elevated status. Then, at 165, the method includes assigning a priority (possibly a weighted priority) based on monitored VIP requests or low bandwidth determinations. A weighted priority is a way of assigning priority based on different factors—where each factor is assigned a different weight(s). The priority is computed as a function of these weighted factors. For example a VIP service may depend on the factors such as i) importance of the activity (such as emergency, business, entertainment, law and order), ii) number of cell lines or persons impacted, iii) repeat business and customer relationship etc., where each of the factors are assigned a different weight and the final priority is computed as a function of these weighted factors. A further determination is made at 170, FIG. 3 as to how many VIP requests can be handled by a single UAV, and further evaluating the UAVs' current assignments. For example, one or more deployable UAVs may be grounded, others already in the air, etc. Finally, at 175, the method includes deploying any available UAVs with current assignment that are weighted less than the VIP assignment.

Figure 4:
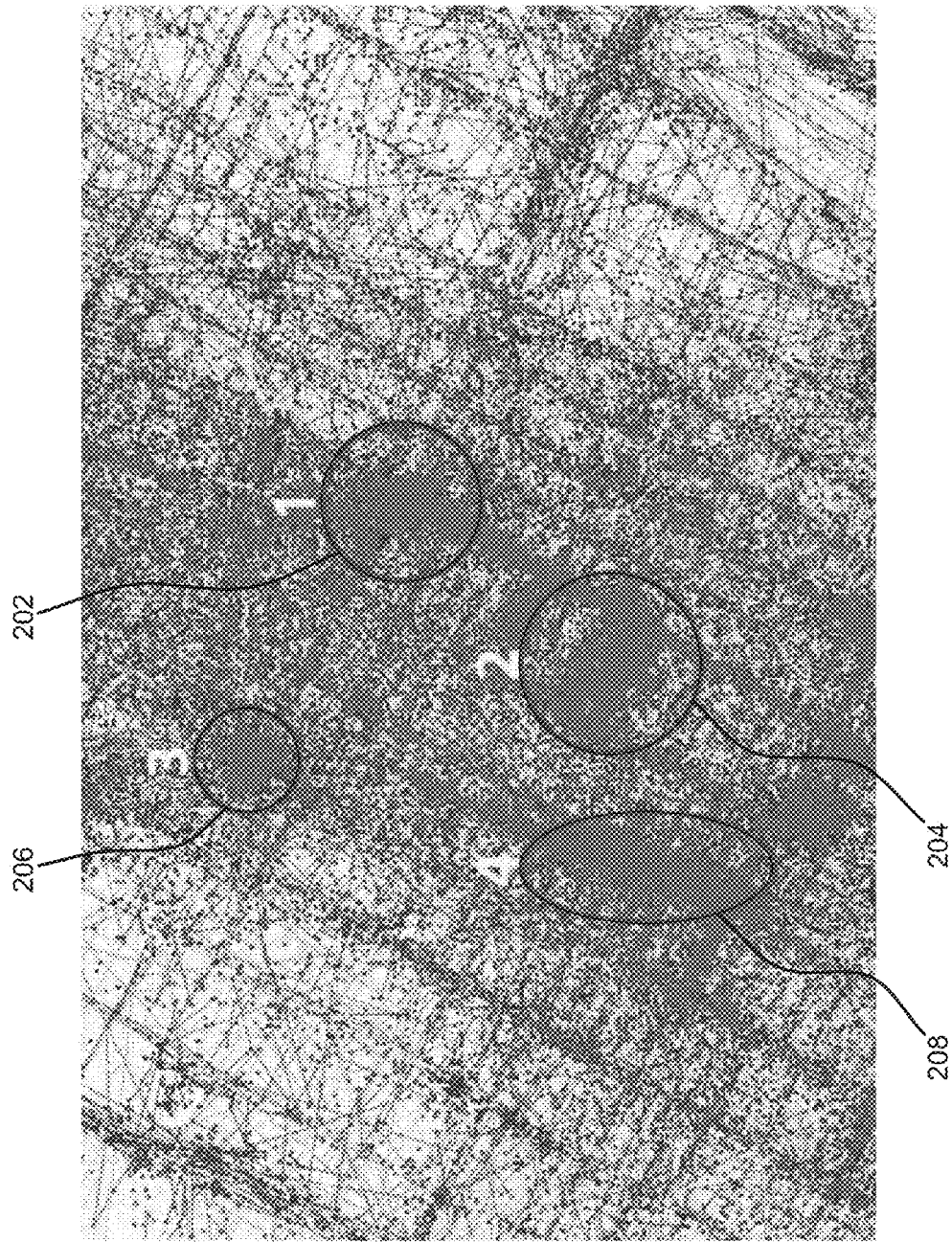
FIG. 4 depicts an example of a generated "heat map" 200 of an area of New York City showing areas under coverage at a certain times in New York City as predictively determined.

In a further aspect, the central servers 25 employ a method is provided for detecting the convergence, or migration patterns, of large groups. This method considers movement of dark spots of cellular coverage along a time scale which may, for example, happen when large groups such as commuters converge toward, or diverge away from, a downtown area in the morning and evening. For example, as shown in FIG. 4, a "heat map" 200 of an area of New York City is depicted showing areas 202, 204, 206 and 208 of under coverage at a certain times in New York City. The heat map clusters are determined predictively. In one embodiment, the information used in determining the predictive clustering of group movement, is based on geo-tagged tweets from mobile devices.

Figure 5:
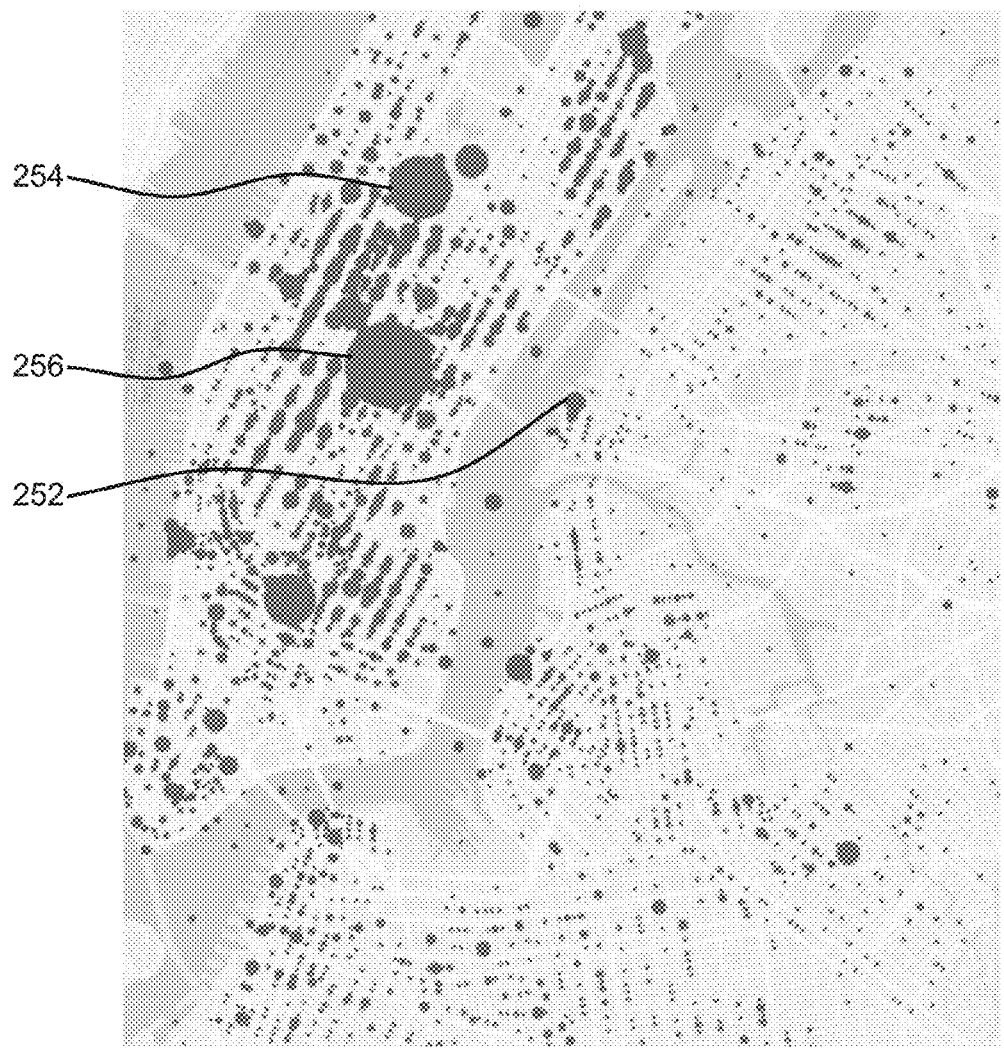
FIG. 5 depicts a plot of example results 250 of methods employed by the central server 25 to determine dark spots based on aggregate geo-tagged Tweets.

In one embodiment, FIG. 5 depicts a plot of results 250 of methods employed by the central server 25 to determine dark spots based on aggregate geo-tagged Tweets, which data may be obtained from the Twitter® service. Particularly, Twitter® provides geo-tagged tweets with latitude and longitude coordinates in a city, e.g., New York City. FIG. 5 specifically shows the aggregated geo-tagged tweets referencing the word "Sandy" between certain days, e.g., six (6) days in October 2012, at a certain time of day. Using known techniques, tweet locations are aggregated to census blocks. Dark spots 252-256 indicate the number of Tweets in order of aggregated amounts with small dark spots 252, 254 showing areas of sourcing small amount of aggregated Tweets, e.g., 50, or 100, and larger DOTs 256 indicating areas sourcing larger amounts of Tweets, e.g., 150. These dart spots denote inadequacy of cellular coverage.

Input of social media mainly refers to use of Twitter®, Facebook® posts—as a large volume of data are already geo-tagged in Twitter®—because pictures taken by mobile handheld devices are geo tagged. Google+ also makes use of geo-tagging from the Google Map to which it is connected as well as Android OS that is part of many mobile systems. Considering that a large number of mobile devices use either Android® or Apple® IoS—that use Google map mostly—coverage of a large portion of mobile device users is enabled. Windows® CE provides an equivalent system to Google as well.

Figure 6:
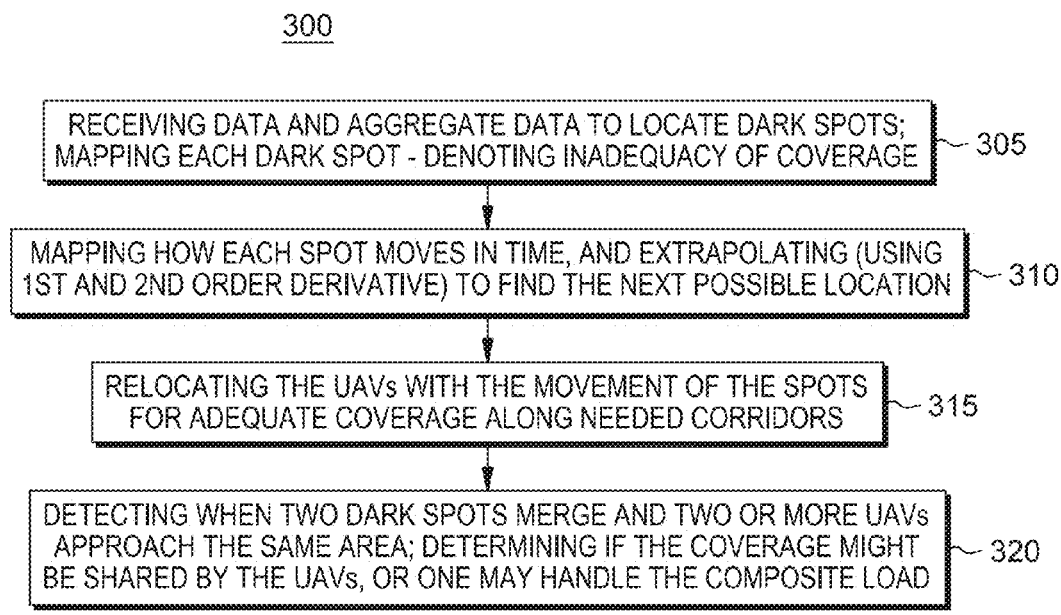
FIG. 6 depicts an example short term predictive method 300 employed in one embodiment for determining UAV location coverage.

As shown in FIG. 6, a short term predictive method 300 is employed including a first step 305 for mapping each dark spot denoting inadequacy of coverage to geographic locations. Then, at 310, the method includes mapping how each spot moves in time, and then extrapolating to find the next possible location.

In one embodiment, to locate "dark spots" the cellular communications network towers, repeaters and connectors obtain data to measure the health of the network along with how much traffic and the capacity usage using methods known in the art. However, this data is used to compute first and second order derivatives in both time as well as space domains to determine both the direction of the flow as well as the speed of the direction of the flow. These results enable to predictively determine where there is the need for additional coverage using a drone.

Then, at 315, the method relocates UAVs with the movement of the spots for adequate coverage along needed corridors. Then, at 320, the method includes detecting when two dark spots have merged, and determining whether two or more UAVs approach the same area—i.e., the coverage might be shared by the UAVs, or determining whether one UAV cell tower may handle the composite load.

Each UAV employing cellular transceivers and repeaters is configured to handle any data interference problems in the same way cellular data and the devices themselves avoid interference: by using different bands of frequencies, and within the same band of frequency, using time division multiplexing (TDMA) and frequency division multiplexing (FDMA). These data interference techniques would be used if two or more UAV's are needed for increased coverage.

In a further embodiment, a longer term predictive method is employed. In this method, the central server 25 receives as input historical traffic data from a transportation data source, e.g., a department of transportation, and others sources to determine how traffic patterns change, based on the time of the day, month, weather, and season. The method creates a predictive map and plans for moving the UAV cell tower along the necessary corridors. One method employed for providing predictive traffic information is described in commonly-owned U.S. Pat. No. 8,150,611 the whole contents of which is incorporated by reference as if fully set forth herein.

Figure 7C:
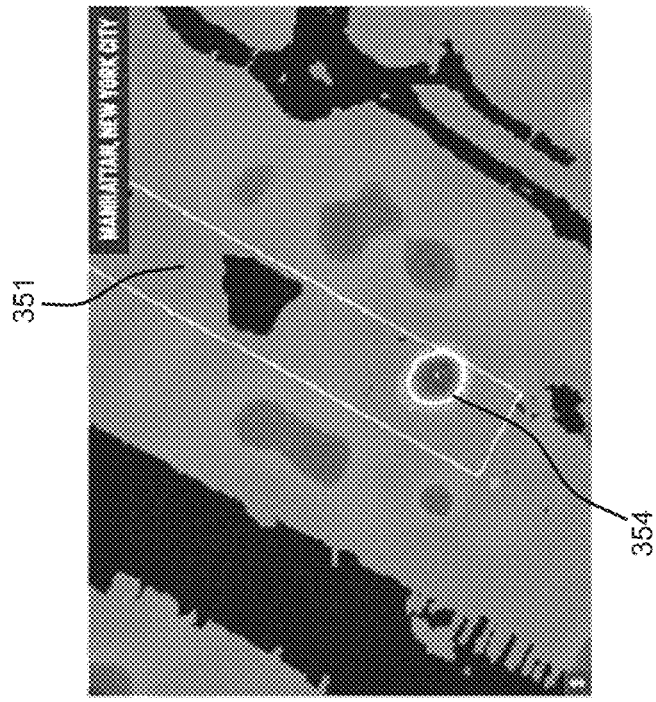
FIGS. 7A, 7B and 7C show an example of an ebb and flow of city dwellers in an area of New York City which reveal granular insights as to dark spot movement in one embodiment.
Figure 7A:
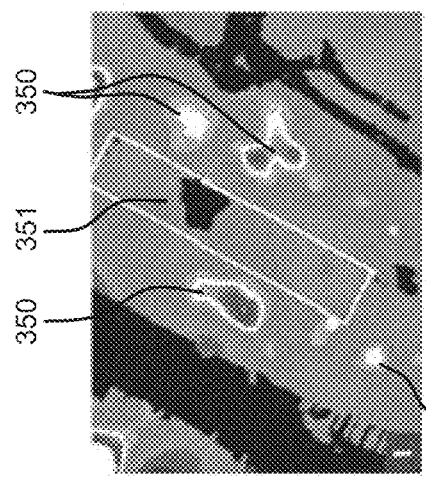
Figure 7B:
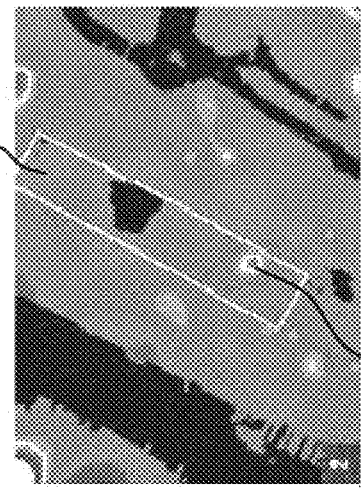

FIGS. 7A, 7B and 7C show an example ebb and flow of city dwellers in an area of New York City. The specific observations such as shown in FIG. 7A-7C reveal granular insights. FIG. 7A depicts cellular phone usage data 350 captured on a particular afternoon on a weekend day in winter season, e.g., February. As shown in FIG. 7A, there is indicated a high call usage activity 350 from residential areas bordering the Central Park 351. FIG. 7B shows the same afternoon weekend day during a summer month, e.g., July, with cell phone usage activity 352 shifting to the southern end of Central Park 351. FIG. 7C shows a delta computation where the winter map of FIG. 7A is subtracted from the summer map of FIG. 7B to reveal the calling pattern 354 more clearly as the residents in the homes surrounding the park leave the city during summer weekends and those who remain flock to the park.

Thus, in the manner as described in FIGS. 1-7C, the system and method permits increased customer satisfaction with cellular service, and lowers the costs necessary to deploy fixed infrastructure. In doing so, it permits sophisticated approaches and new applications for the burgeoning field of domestic UAV use.

In further embodiment, the central servers employ methods that provide predictive deployment criteria for unmanned aerial vehicles to improve communications. More particularly, in a further embodiment, there is provided increased cellular coverage by predicting where crowds will converge and deploying UAVs in advance of the predicted event. Several usage examples follow:

In a first usage example, a public protest is planned by a large group of citizens in a downtown area of New York City. The number of people converging on this atypical area will normally cause a strain on the cellular communications capability creating spotty and degraded cell service. However, using the methods described herein, the system is monitoring public transportation for anomalies. As the time approaches and citizens begin to gather the system sees a trending increase in the number of people paying for taxi fares that terminate at or near Wall Street. The system also notices an increasing number of people using busses and subways on lines that terminate near Wall Street. In anticipation that the trends will continue to increase, several telecommunications companies deploy UAVs to the Wall Street sector to handle the predicted increase in voice and data traffic.

In a second usage example, a large number of sightseers are part of a guided tour that includes several bus loads of people. In addition there was a large world championship game the day before where the hometown team won, and as a result there will be a lot more people gathering to celebrate that evening than is normal. The system performs monitoring for trends in financial transactions which would give clues to just such an unplanned convergence of people. The system begins to pick up increased transactions for parking meters and issued citations for illegal parking just before the typical dinner hour. It then begins to detect increases in the number of people visiting bars and street-side venues and even sees a general migration towards public gathering places. The system determines that there is a likely chance that the trend will continue by monitoring the social media "buzz" where people are recommending their friends join them for the celebration. As a result, UAVs are deployed in advance of any degraded signals or capacity problems.

Figure 8:
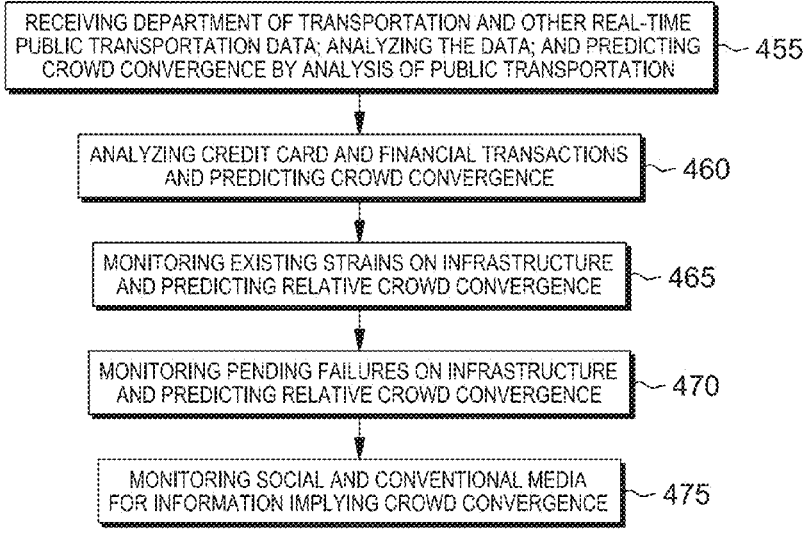
FIG. 8 shows a method 450 that integrates one or more predictive methods employed in one embodiment for determining UAV location coverage.

Several predictive methods may be employed for the central servers to deploy UAVs in advance of problems to increase cellular coverage in areas where it is predicted that people will converge, in excess of cellular capacity. FIG. 8 shows a method 450 that integrates one or more predictive methods. At 455, the central server 25 of system 10 receives department of transportation and other real-time public transportation data, e.g., and/or for hire transport data, analyzes the data, and predicts crowd convergence by analysis of public transportation. The transportation data received is public data available in real time such as is often used by many GPS algorithms to provide real time traffic analysis. The real time transportation data received is monitored may include: capturing taxi or ride-sharing pick-up/drop off locations and the changes in frequency over time; and capturing usage of the number of people using buses and subways and their known destinations. Then at 460, the method includes analyzing credit card and financial transactions to predict crowd convergence. Then, at 465, the method includes monitoring existing strains on infrastructure to predict relative crowd convergence. Then, at 470, the method includes monitoring pending failures on infrastructure to predict relative crowd convergence. Finally, at 475, crowd convergence is predicted by monitoring social and conventional media for information implying crowd convergence.

Figure 9:
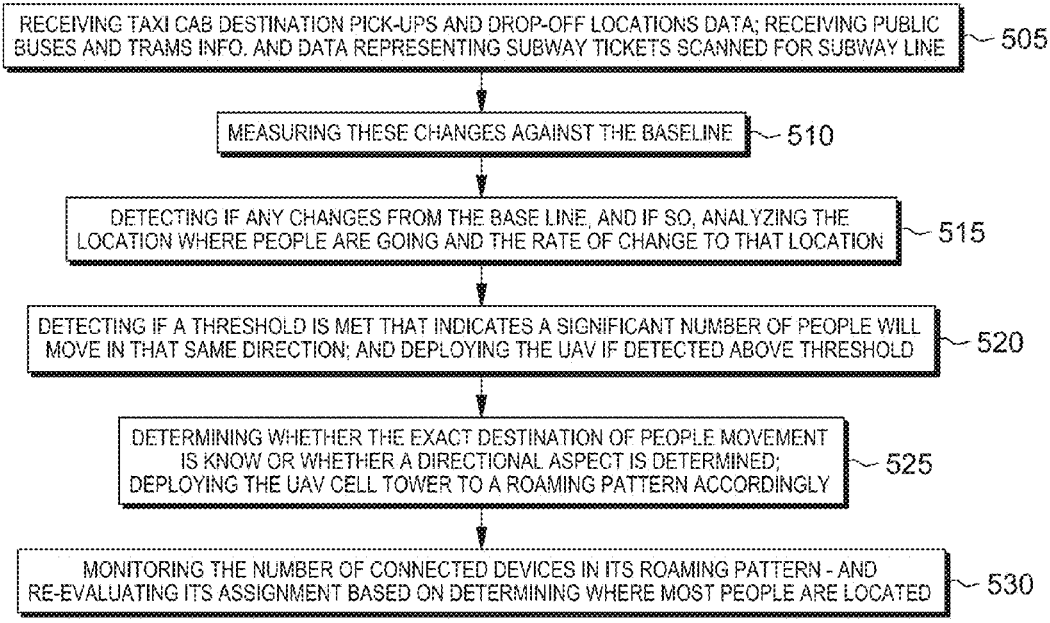
FIG. 9 shows an example predictive method 500 employed to predicting crowd convergence by analyzing public transportation information in one embodiment.

FIG. 9 shows a detailed method 500 representing the next step 455, FIG. 8 directed to predicting crowd convergence by analyzing public transportation information, such as provided by data feeds 47 received at the central servers 25. The detailed method includes: at 505, receiving taxi cab destination pick-ups and drop-off locations data in additional to receipt of information regarding public use of buses and trams and data representing subway tickets that have been scanned and being currently scanned (in real-time) for a subway line(s). Then, at 510, these changes are measured against a baseline. The baseline is computed assuming the average demand for facilities and infrastructure. The baseline might show some normal diurnal or seasonal variations and those are normally accounted for, however may not take into account for exceptional variations. The baseline is based on a historic data and perspective. Normally a baseline may account for a small percentage (say up to 10% of random variations), any variations beyond a nominal variation may cause problem at the cellular infrastructure. At 515, a determination is made whether a change is detected from the baseline, and if a change is detected, then perform further analyzing of the location where people are going and the rate of change to that location. Then, at 520, there is performed detecting if a threshold change compared to threshold is met that indicates a significant number of people will move in that same direction, and in response, initiating deployment of the UAV cell tower if detected above threshold. At 525, a further analysis is made to determine whether the exact destination of people movement is known or whether a directional aspect is determined, and in response, initiating deployment of the UAV cell tower to a roaming pattern accordingly. At 530, there is performed a further step of monitoring the number of connected devices in the UAV's roaming pattern—and re-evaluating its assignment based on determining where most people are.

Figure 10:
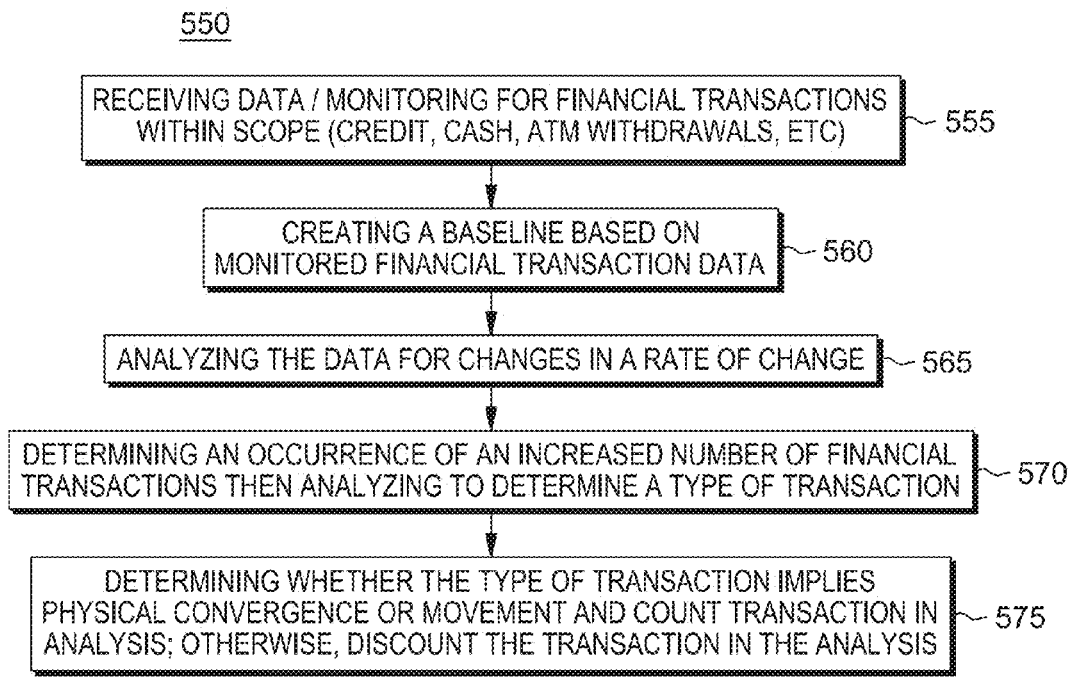
FIG. 10 shows an example predictive method 550 employed to predicting crowd convergence by analyzing credit card and financial transactions in one embodiment.

FIG. 10 shows a detailed method 550 representing the next step 460, FIG. 8 directed to predicting crowd convergence by analyzing credit card and financial transactions. The detailed method includes monitoring for changes in the normal trends of financial transactions, including credit, debit, cash (if applicable), ATM withdrawals, etc. It measures unanimous data in large aggregate conditions for trends or changes in velocity or rate of change over a normal historical record. At 555, FIG. 10 there is depicted the step of monitoring for financial transactions within scope (credit, cash, withdrawals, etc). Then, at 560, the method includes creating a baseline from the financial transaction data received/monitored and created according to a computed assuming the average demand for facilities and infrastructure. This data is then analyzed for changes, e.g., changes to a rate of change. Then, at 565, there is performed analyzing the data for changes in a rate of change. At 570, there is performed determining whether there is an occurrence of an increased number of financial transactions and then analyzing to determine a type of transaction. Then at 575, there is performed determining if it is a type of transaction that implies physical convergence or movement [like purchasing a good or service at a location] in which in response, that transaction is counted in the overall analysis. Otherwise, at 575, if it is determined that it is a type of transaction that doesn't imply convergence (e.g., as in the purchase of a good from an online retail store) then that transaction is not counted in the overall analysis.

Figure 11:
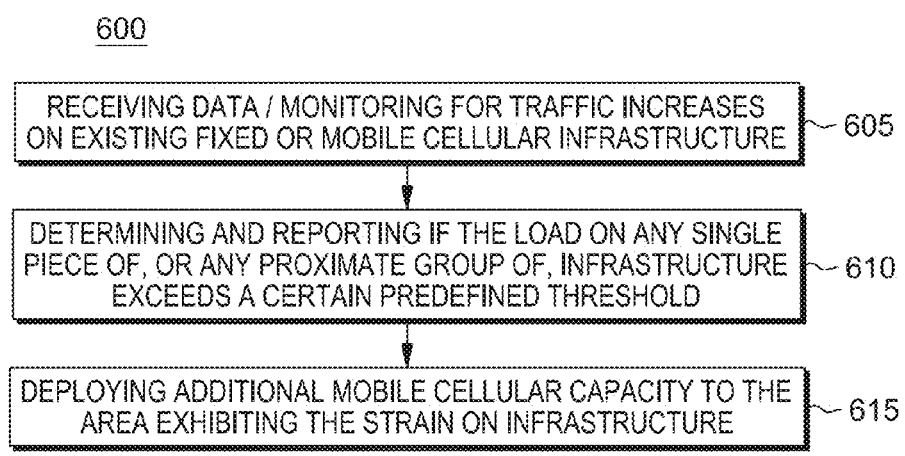
FIG. 11 shows an example predictive method 600 employed to predicting crowd convergence by monitoring existing strains on a mobile cellular communications infrastructure.

FIG. 11 shows a detailed method 600 representing the next step 465, FIG. 8 directed to predicting crowd convergence by monitoring existing strains on a mobile cellular communications infrastructure. This method monitors rising workload on existing fixed or mobile cellular infrastructure, and deploys additional capacity if such strains indicate a potential over-capacity scenario. In one embodiment, the infrastructure may also include mixed cellular infrastructure, where part of the network depends on other form of communication network such as copper, fiber optics, microwave, satellite or other form of networks. At 605, FIG. 11, there is depicted the step of receiving traffic data at the central servers 25 and analyzing the data for monitoring for traffic increases on existing cellular infrastructure. Then, at 610, there is depicted a step of determining and reporting if the load on any single piece of, or any proximate group of, infrastructure exceeds a certain predefined threshold. An example threshold may include a 10% of the computed baseline. Then, at 615, the method includes initiating a deployment of additional mobile cellular capacity to the area exhibiting the strain on infrastructure.

Figure 12:
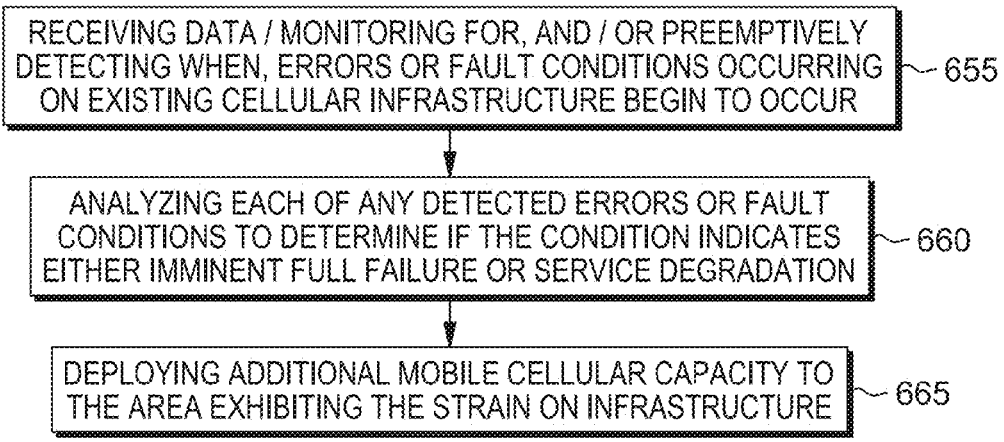
FIG. 12 shows an example predictive method 650 employed to predicting a relative crowd convergence by monitoring pending failures on infrastructure.

FIG. 12 shows a detailed method 650 representing the next step 470, FIG. 8 directed to predicting a relative crowd convergence by monitoring pending failures on infrastructure. This method monitors error or fault conditions on existing fixed or mobile cellular infrastructure, and deploys additional capacity if such faults indicate that a failure (or service degradation) is imminent. In one embodiment, this method presumes a "relative" crowd by which whatever numbers of people inhabit a given area will have demands greater than the remaining service capacity once the switch fails. That is, a relative traffic migration occurs when a particular part of the infrastructure such as a cellular tower or a transceiver fails or malfunctions in a cellular infrastructure and other cellular towers or a transceivers need to accommodate this extra traffic which is different than their nominal load. At 655, FIG. 12, there is depicted the functionality of the central servers 25 of monitoring for, and/or preemptively detecting when, errors or fault conditions occurring on existing cellular infrastructure begin to occur. Such errors may or may not be related to cellular load conditions, and will more generally indicate software or hardware issues. Then, at 660 the method includes analyzing each of any detected errors or fault conditions to determine if the condition indicates that either full failure or service degradation is imminent. Then, at 665, there is deployed additional mobile cellular capacity, e.g., a UAV cell tower, to the area being served by the problematic infrastructure.

Figure 13:
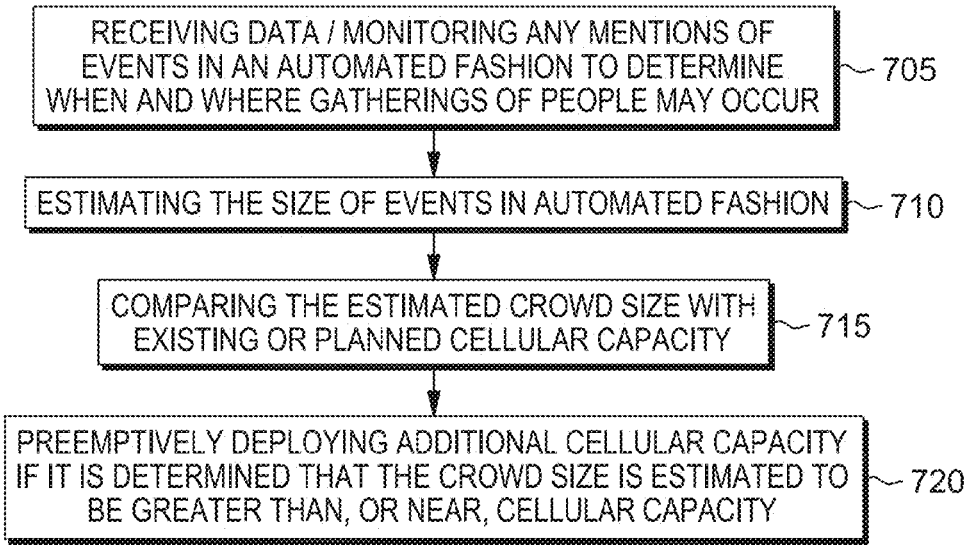
FIG. 13 shows an example predictive method 700 employed to monitoring social and conventional media networks for information implying/predicting crowd convergence.

FIG. 13 shows a detailed method 700 representing the next step 475, FIG. 8 directed to monitoring social and conventional media networks for information implying/predicting crowd convergence. The central services 25 monitor social and conventional media to determine through automated fashion where crowd convergence in excess of existing cellular capacity may occur. At 705, FIG. 13, there is depicted the step of monitoring in the social media feeds (e.g., geo-tagged tweets) any mentions of events in an automated fashion, e.g., textual analysis, sentiment analysis, etc., to determine when and where gatherings of people may occur. Then, at 710, the method includes estimating the size of events through automated fashion, e.g., venue size, ticket sales, RSVPs, or other analogous indicators. At 715, the method includes comparing the estimated crowd size with existing or planned cellular capacity. Finally, at 720, the method initiates preemptive deployment of additional cellular capacity if determined that the crowd size is estimated to be greater than, or near, cellular capacity.

Illustrative and non-limiting example usages of the methods described herein above for providing increased cellular coverage by reacting to crowd movements in real time and deploying UAVs in to redeploy themselves as quickly as possible are now provided.

Example Usage 1

For application at coverage scales ranging between 1-10 miles. City vehicle traffic is planned for the usual roads such as shown in the system of FIG. 21 and traffic is moving smoothly as predicted. Suddenly there is an accident causing mile after mile of stop and go traffic. Each occupant in the vehicle trying to communicate to their place of work as well as home regarding the possible delay—causing unusually large call volume near the place of the accident. The occupants are at the same time trying to report the incident, or trying to find more about the incident in social media. In such a scenario, existing UAVs would be redeployed with additional capacity and new UAVs are relocated to back up other UAVs to fill up the gap for the needed capacity.

Example Usage 2

For application at coverage scales ranging between 5-30 miles. As a result of a sudden change in weather condition, vehicle traffic is moving very slow on a weekday morning and cellular towers are having trouble keeping up with the number of subscribers in their vicinity. Since traffic is moving even slower as it gets closer to the city, the hand over from one tower to the next is getting affected as well. This requires a certain additional UAVs to support the existing cell towers and create a smooth hand over of calls.

Example Usage 3

For application at coverage scales ranging between 5-30 miles. As a result of an accident in a main road, traffic is rerouted to the side roads—creating additional traffic burdens on the side roads. People are now consulting their mobile device traffic applications and choosing to use alternate suggested routes as opposed to the usual route. Since these alternate roads are not meant to handle such a large volume of traffic who are trying to communicate to their place of work as well as home regarding the possible delay—this causes unusually large call volume. The occupants are at the same time trying to report the incident or trying to find more about the incident in the social media. In such a scenario, existing UAVs would be redeployed with additional capacity, and new UAVs are relocated to back up other UAVs to cover the gap for the additional demand.

Example Usage 4

For application at coverage scales ranging between 500 feet to 5 miles. A popular game such as football's Super Bowl is occurring in a stadium. Small sized UAVs are deployed over the field to account for the additional usage required for the spectators and their need to communicate and be connected with the social media. To avoid conflict the supporters of Team A are seating at a particular location that is avoided by the supporters of Team B. Team A scores a touch down and the supporters of Team A go abuzz on the social media and supporters of Team B go quiet with astonishment. In such a case existing UAVs are redeployed with additional capacity and new UAVs are relocated to back up other UAVs to fill up the gap for the needed capacity.

Example Usage 5

For application at coverage at any scale. A network of UAVs, i.e., a set or a cluster of UAVs creating a communication network such as a peer-to-peer or a master-slave network. are deployed to support the land-based cellular communications network infrastructure. A few of the cell towers as well as UAVs suddenly malfunction—creating a gap in the network. In such a case existing UAVs are redeployed with additional capacity and new UAVs are relocated to back up other UAVs to fill up the gap for the needed capacity.

In a further embodiment, the system and methods at the central servers 25 will redeploy cell tower equipped UAVs in reaction to one or more problems to increase cellular coverage in areas where it is determined call volume suddenly goes in excess of cellular capacity. In this embodiment, the system configures itself as an autonomic network of UAVs that autonomously redeploy and regroup to self correct for additional requirements. By following the social media and local Department of Transportation (DOT) traffic reports, weather reports and accident information reports, UAVs may be redeployed and regrouped to self correct for additional requirements. In reaction to the traffic—vehicles change their route and communicate that either through a vehicular network or through a server to a central communication hub. The communication hub in turn re-routes and deploys the UAV network to take care of the changed conditions.

Figure 14:
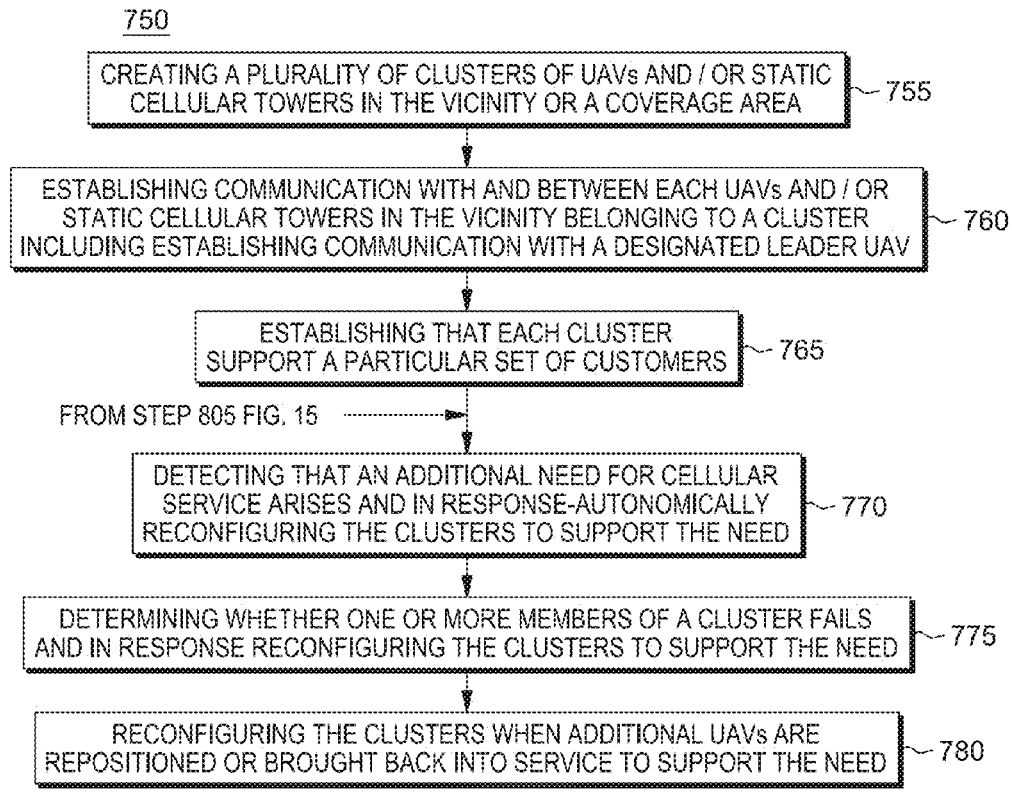
FIG. 14 shows an example predictive method 750 for configuring an autonomic network of UAVs that autonomically redeploy and regroup to self correct for additional requirements.

FIG. 14 shows a detailed method 750 for configuring an autonomic network of UAVs that autonomously redeploy and regroup to self correct for additional requirements. The method at 750 includes a first step of: creating a plurality of clusters of UAVs and/or static cellular towers in the vicinity or a coverage area. Then, the method at 760 includes establishing communication with and between each of the UAVs and/or static cellular towers in the vicinity belonging to a cluster, and with and between a designated leader UAV. The designated leader monitors the functioning of the rest of the UAVs in an ad hoc cluster and assign loads to each of the UAVs in the network. The method at 765 then includes establishing that each cluster support a particular set of customers. Thus, as shown at 770, when there is detected that an additional need for cellular service arises—the clusters are autonomically reconfigured to support the need. Further, at 775, there is made a determination whether one or more members of a cluster fail. In response, the clusters are again reconfigured to support the need. Finally, at 780, the method includes reconfiguring the clusters when additional UAVs are repositioned or brought back into service to support the need.

Figure 15:
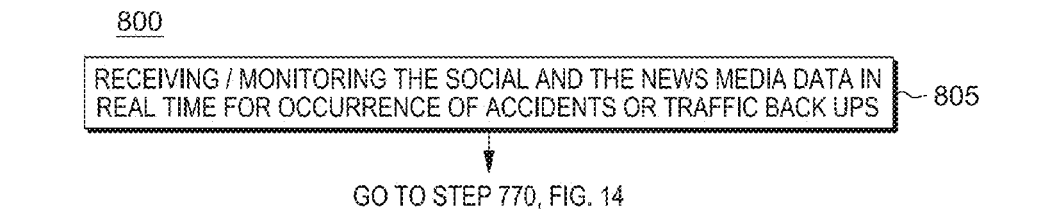
FIG. 15 shows an example method 800 implemented to follow social media data and traffic reports, weather and accident information to redeploy and regroup to self correct for additional cell phone coverage requirements.

FIG. 15 shows a method 800 implemented to follow the social media data and DOT traffic reports, weather and accident information to redeploy and regroup to self correct for additional requirements. In a first step 805, the method includes monitoring the social and the news media in real time for occurrence of accidents or traffic back ups. Then, the method returns to step 770, FIG. 14 so that each cluster can be reconfigured to support the need.

Figure 16:
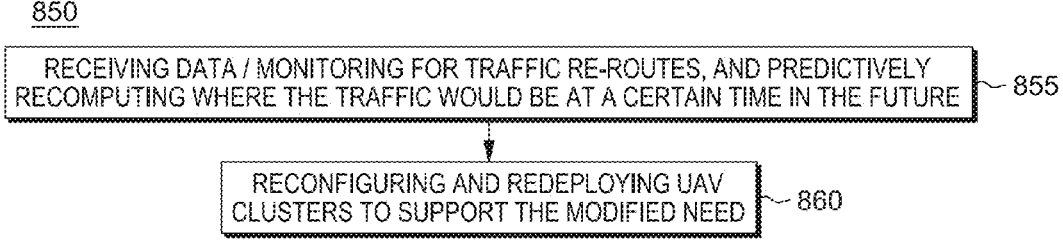
FIG. 16 shows an example method 850 implemented to reroute and deploy the UAV network to take care of the changed conditions in reaction to the traffic/vehicle route changes.

FIG. 16 shows a method 850 implemented to reroute and deploy the UAV network to take care of the changed conditions in reaction to the traffic, e.g., detecting that vehicles have changed their routes and communicate that either through a vehicular network or through a server to a central communication hub. The communication hub in turn reroutes and deploys the UAV network to take care of the changed conditions. Thus, in FIG. 16, at 855 the method includes predictively recomputing using the DOT, news and traffic data feeds to the central server 25 where the traffic would be at a certain time in the future. This may occur responsive to when traffic re-routes to different locations in reaction to an accident or a traffic event as opposed to their anticipated locations. Then, at 860, in response to the changed configuration(s), the UAV clusters are reconfigured and redeployed to support the modified need.

In additional embodiments, the system employs methods for self-optimizing UAV deployments over a geographical region. That is, while the solution to improve cellular coverage by deploying a single UAV to address a specific gap is addressed, methods are provided to further address a scenario where multiple UAV's are deployed to address their individual objectives. In the further methods, multiple UAVs are configured to discover each other, build a common "usage demand map" and then use that map to calculate an areal relocation plan that ensures the individual objectives are met but also allows a neighboring UAV to supplement the coverage services of another UAV thus creating an optimal combined deployment plan. Thus, there is addressed using multiple cell-tower equipped UAVs, and optimizing the configuration of multiple cell-tower equipped UAVs within an area to accomplish their individual objectives as well as reach an ideal combined solution based on positioning.

Figure 17A:
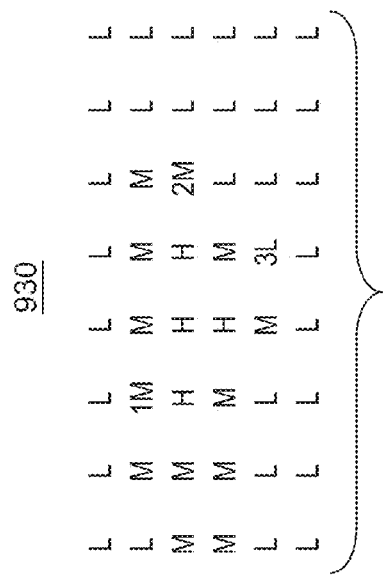
FIGS. 17A-17C depict example "usage demand" maps generated to represent the relative demand over time for cellular service in a particular setting/area with FIG. 17A depicting an initial load, and FIGS. 17B-17C showing load changes requiring UAV deployments.

Thus, the system enables UAVs to reposition themselves "on the fly" and to achieve a best fit configuration for service, based on detection of their own service demands and communication with other UAVs in a given region. For example, FIG. 17A depicts a grid 900, i.e., a "usage demand" map generated to represent the relative demand for cellular service in a setting, e.g., an urban setting. In the grid 900 of FIG. 17A, reference to L==Low usage demand, M==Medium usage demand, and H==High usage demand. The indicators may represent any unit of geographic measurement, e.g., from a city block, to square mile, to any other applicable measure of area.

Figure 17B:
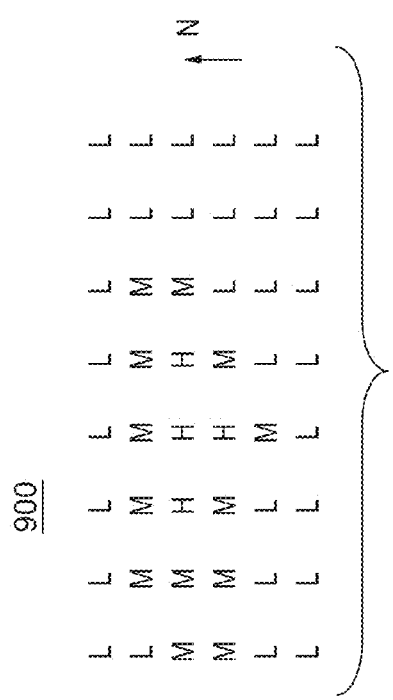

Then, it may be subsequently detected that an initial deployment, based on changed demand from factors determined by methods described herein, results in UAV placement as indicated by the grid 920 of FIG. 17B. The consecutive numbers labeled 1, 2, 3 in the grid 920 of FIG. 17B correspond to deployed UAVs, UAV1, UAV2 and UAV3, respectively, for tracking purposes.

Figure 17C:
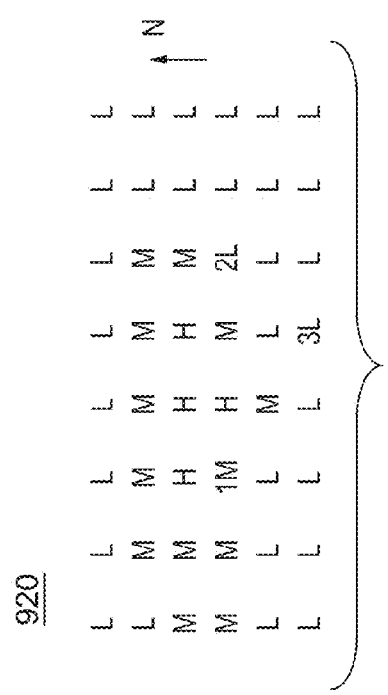

However, based on methods described herein, a problem subsequently is detected to exist in that the loads on UAVs 1 and 2 become much heavier than that on UAV3. For example, this may be because UAVs 1 and 2 are positioned much closer to heavy pockets of cellular demand than is UAV 3. Correspondence between the three UAVs labeled 1, 2 and 3, during which they compare their respective workloads, reveal this to be the case. By triangulation, the UAVs can determine that the bulk of the cellular demand is occurring at points north. They can then quickly agree on a "best fit" organization to balance cellular traffic, resulting in a configuration such as the shown by the grid 930 in FIG. 17C.

Thus, in a further aspect, a method is invoked to detect newly deployed drones, create a common "usage demand map", and then calculate and reposition drones to an optimal configuration. In this embodiment, a "best fit" occurs when the UAVs, e.g., UAV1, UAV2 and UAV3, are positioned so that they have either approximately the same amount of network traffic passing through them, or more likely, a normalized equivalent amount of traffic. Thus, for example, if the switches have differing capacities, they could each be running at the same level, for instance 40-45% of overall capacity.

Furthermore, in this mobile infrastructure, the method regularly conducts such reorganization, e.g., every 30 seconds, 5 minutes, or 30 minutes, such information could be exchanged between and amongst the UAVs, and the infrastructure would reposition itself such that the mobile capacity was fairly balanced between the existing cellular workload.

Figure 18:
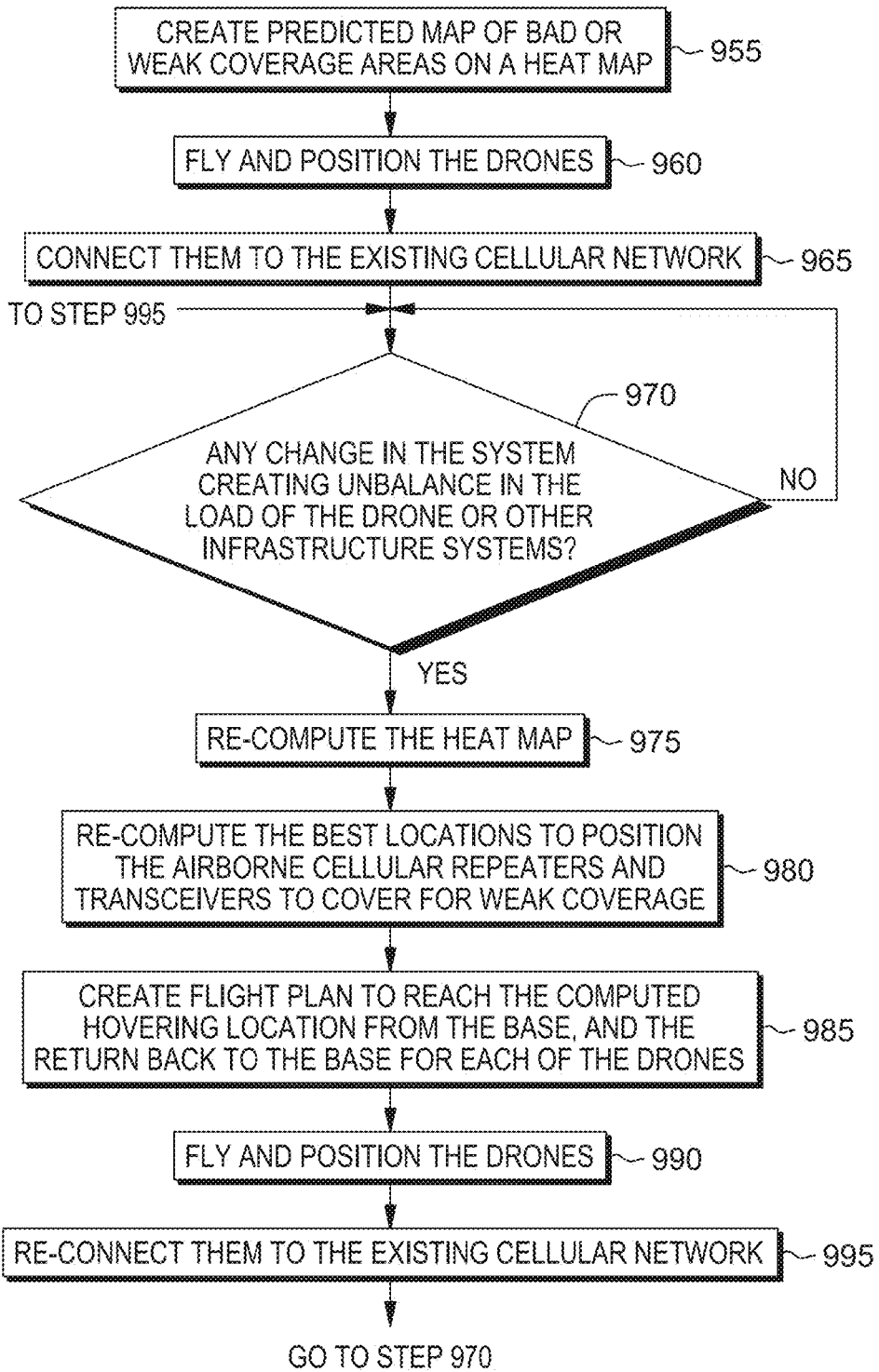
FIG. 18 shows an example method 950 for configuring UAVs to reposition themselves "on the fly" according to one embodiment.

FIG. 18 shows a detailed method 950 for dynamic reconfiguring of UAVs to reposition themselves "on the fly" and to achieve a best fit configuration for service, based on detection of their own service demands and communication with other UAVs in a given region. Using the methods described herein, a usage demand map or "heat" map is generated that includes predicted areas of bad or weak cell phone usage coverage. Then at 960, a single or multiple UAVs is/are deployed as per requirements based on methods described herein. Then at 965 the UAV(s) are connected to the existing cellular network using known cellular phone infrastructure protocols and interfaces. Then, at 970, a determination is made as to whether there occurs any change in the system creating an unbalance in the load of the drone or other infrastructure systems. If no load change occurs, the process remains idle until such a determination is made. If there is a determined load change, then the process proceeds to 975 to initiate a re-computation of the "usage demand map" (such as shown in FIG. 17A) that is shared amongst all UAVs. Then, at 980, the method re-computes the best locations to position the airborne UAV laden with cellular repeaters and transceivers to accommodate for the weak coverage. As part of step 980, the method may perform calculating an optimal placement of UAV's such that: 1. the original objective for each UAV(s) is(are) met; and 2. The positioning allows it to offload network demand from one or more surrounding UAVs. Then, at 985, the method performs creating a flight plan to the reach the computed hovering location from the base and the return back to the base for each of the drones. Then, at 990, the method includes repositioning all drones to the optimal location. Then, at 995, each of the drones is reconnected with the existing cellular network. It is understood that the process may return to step 970 to update the "usage demand map" responsive to any detected load changes in the drones or infrastructure network.

Thus, the self-correcting method is employed when there is a sudden shift in the usage demand map ("heat map") as discussed herein above. This method considers the dynamic situation when things change unpredictably: For example, 1) when one of the UAV loses power or is decommissioned; or 2) the load of some UAV has increased whereas some other UAV does not have enough load. An algorithm is employed to dynamically balance the load among all the working UAVs using such as the algorithm described in commonly-owned U.S. Pat. No. 7,328,363 (the whole contents and disclosure of which is incorporated by reference herein) with one significant difference: the UAVs cannot change the location instantaneously and reposition themselves. Thus, additional steps are employed:

1. If all the UAVs are close by that is all near the hot spot, do not reposition any of the UAVs but essentially re-balance the load based on the algorithm described in U.S. Pat. No. 7,328,363.

2. If one or more UAVs are far off, the algorithm in U.S. Pat. No. 7,328,363 is modified to consider the actual physical distance of the UAV in the network distance as described there in and minimize/find the optimal physical distances of all the UAVs to determine the optimal modified configuration and placement of all the UAVs for repositioning accordingly.

As an example implementation, there is considered a deployment of a single UAV (per requirements of methods herein). A determination is made as to whether other UAV's have already been deployed in the surrounding region. If other UAV's have already been deployed, then a "usage demand map" is built that is communicated and shared amongst all the UAVs. Then, the method calculates the optimal placement of the UAV's such that the original objective for that single UAV is met, and that its positioning permits it to offload network demand from one or more of the prior deployed surrounding UAVs. Then, based on the usage demand map, all drones are repositioned to the optimal location. These steps are repeated until a new single UAV is deployed or removed, in which case the method continues to determine the presence of other deployed UAVs in the area, building the usage map and communicating it amongst all UAV's for optimal repositioning. Whether, a new UAV(s) is(are) deployed, the system periodically updates the "usage demand map", communicates it among the UAVs, and re-calculates the optimal positioning of the UAVs based on the updated usage map.

It should be noted that while existing cellular network infrastructures are often created with capacity plans which include peak or near-peak traffic, resulting in relatively high costs for leasing space, site installation, repair, maintenance, and other expenses, the deployment and use of UAVs in the manner as described herein will mitigate that problem by permitting fixed infrastructure to be sized for lower capacity, thus saving cost, and augmenting this capacity by UAV when needed.

Figure 22:
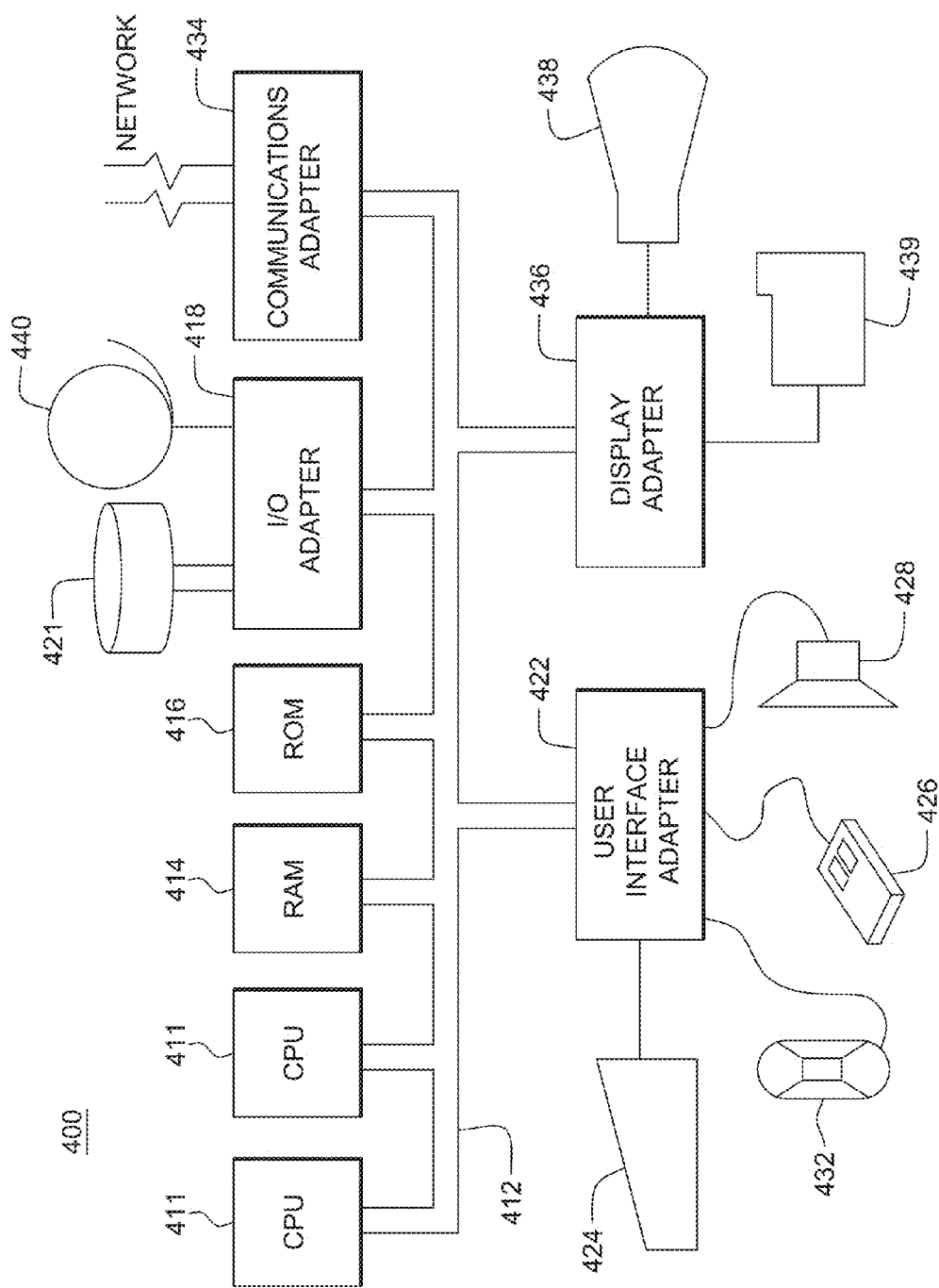
FIG. 22 illustrates an exemplary hardware configuration 400 of a central server running and/or implementing the method steps described herein.

FIG. 22 illustrates an exemplary hardware configuration 400 of a central server running and/or implementing the method steps described herein with respect to FIGS. 1-3, 6, 8-16 and 19-21. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for extending cellular phone coverage of a land-based cellular phone network comprising:
 a memory storage device;
 a computing device implementing a hardware processor coupled to said memory storage device and configured to:
  receive information to determine a predicted or actual increase in aggregate cellular phone usage demand in an area at a determined time, said received information comprising data indicating a convergence or migration of many mobile phone users to the area;
  predict a clustering of mobile device user group movement based on said information indicating a convergence or migration;
  generate a usage demand map indicating the predictive clustering of said mobile device user group movement at the area,
  identify, using said usage demand map, a predicted or actual increased aggregate cellular phone usage demand for said area;
  determine whether there exists a mismatch of existing coverage compared with said predicted or actual increased aggregate cellular phone usage demand for said area such that additional coverage is needed at the determined time;
  determine, based on an identified mismatch, a plan for deploying one or more mobile cellular unmanned aerial vehicle (UAV) having telecommunications equipment configured to extend wireless cellular phone network coverage of an existing land-based cellular phone network to said area; and
  send, by the computing device, a signal to a facility configured to deploy said one or more mobile cellular UAVs to said area according to said plan, wherein, responsive to said signal, said one or more mobile cellular UAVs are deployed to said area to connect with said existing land-based cellular phone network and extend cellular phone usage coverage at said area.

2. The system as claimed in claim 1, wherein to determine said predicted or actual increase in aggregate cellular phone usage demand, said hardware processor is configured to:
 detect one or more of: incoming signal strengths from mobile phone users received at a fixed land-based cellular phone tower associated with said area, or a number of dropped call events detected of from a fixed land-based mobile cellular tower to other fixed land-based mobile cellular towers.

3. The system as claimed in claim 1, wherein to determine said predicted or actual increase in aggregate cellular phone usage demand, said hardware processor is configured to:
 monitor said cellular phone network land-based fixed cellular phone tower bandwidth, and calculate a metric using said monitored fixed cellular phone tower bandwidth divided by a number of registered users.

4. The system as claimed in claim 1, wherein said information including data indicating a convergence or migration includes one or more customer requests for increased coverage at said area for a specific time duration, wherein said hardware processor is configured to:
 detect customer requests from one or more of: high profile users, very important customers or customers having a contract with a cellular phone network carrier, emergency responders, personal calendar events shared voluntarily with the cellular phone network carrier.

5. The system as claimed in claim 1, wherein said information including data indicating a convergence or migration is based on received transportation information including one or more of: data representing hired vehicle destination pick-up and drop-off locations, data representing current use of public transportation vehicles, data representing subway tickets sold to mobile phone users, wherein to determine from said information indicating a convergence or migration, said hardware processor is configured to:
- analyze from said received transportation information a location where people are going and a rate of change to that location; and
- detect if a rate of change compared to threshold is achieved that indicates a significant number of people will move in that same direction.

6. The system as claimed in claim 1, wherein to predict clustering, said hardware processor is configured to:
- detect a destination of people movement; or
- detect a directional aspect of people movement; and
in response to a destination or directional aspect detection, generate a further plan for deploying said one or more mobile cellular UAVs to a roaming pattern to accommodate said destination or directional aspect; and
- send signals are sent to a facility to deploy and dispatch said one or more mobile cellular UAVs.

7. The system as claimed in claim 6, wherein signals are sent to a facility according to said further plan to deploy and dispatch two or more mobile cellular unmanned aerial vehicles, said hardware processor is further configured to:
- detect a merging of two or more group movements that provides a composite load to said area;
- determine whether two or more mobile cellular UAVs approach said area; and, one of:
- share increased mobile cellular phone coverage by the two or more mobile cellular UAVs, or
- determine whether one deployed mobile cellular UAV may handle the composite load.

8. The system as claimed in claim 6, wherein said information including data indicating a convergence or migration of many mobile phone users is based on financial transactions information, said financial transactions data including one or more types of: credit, debit, cash, ATM withdrawals transactions, wherein to determine, said hardware processor is further configured to one or more of:
- monitor for occurrence of an increased number of financial transactions of a particular transaction type;
- determine if it is a type of transaction that implies said physical convergence or migration; and
- determine for a trends or changes in velocity or rate of change of said as compared to a baseline measure; and
- in response to a determined trend or change, generate said further plan for deploying said one or more mobile cellular UAVs to a roaming pattern to accommodate said destination or directional aspect.

9. The system as claimed in claim 1, wherein said information including data indicating a convergence or migration of many mobile phone users is based on received social media information or conventional media information implying said convergence or migration, said social media network information data including: data from geo-tagged tweets or social media network messages from said user mobile devices, said clustering of group movement prediction being based on said geo-tagged tweets or said social media network messages.

10. The system as claimed in claim 1, wherein to determine said plan to deploy a mobile cellular unmanned aerial vehicle, said hardware processor is configured to:
- configure an autonomic network of mobile cellular UAVs and sending signals to deploy one or more clusters of said mobile cellular UAVs network in a vicinity of or at said area;
- detect one or more events indicating a need for new or additional requirements;
- update said usage demand map based on said detected events; and
- autonomically redeploy or regroup one or more mobile cellular UAVs of a cluster to self correct said autonomic network based on said updated usage demand map.

11. The system as claimed in claim 10, wherein to autonomically redeploy or regroup one or more mobile cellular UAVs of a cluster, said hardware processor is further configured to:
- establish communication among each mobile cellular UAV and a designated leader in the cluster, each said UAV's communicating data according to said updated usage demand map;
- monitor that one or more mobile cellular UAVs of said cluster support a particular cell phone usage demand in said area or vicinity according to said updated usage demand map, and
- self-correct a capacity of said cluster according to said updated usage demand map.

12. A method for extending cellular phone coverage of a land-based cellular phone network comprising:
- receiving, at a hardware processor of a computing device, information for determining a predicted or actual increase in aggregate cellular phone usage demand in an area at a determined time, said information comprising data indicating a convergence or migration of many mobile phone users to said area; predicting, using the hardware processor, a clustering of mobile device user group movement from said information indicating a convergence or migration;
- generating, by the hardware processor, a usage demand map indicating the predictive clustering of said mobile device user group movement at said area, and identifying, using said usage demand map, a predicted or actual increased aggregate cellular phone usage demand for said area;
- determining, at said hardware processor, whether there exists a mismatch of existing usage coverage compared with said determined increased aggregate cellular phone usage demand for said area such that additional coverage is needed at the determined time;
- determining, based on an identified mismatch, a plan for deploying one or more mobile cellular unmanned aerial vehicles (UAV) having telecommunications equipment configured to extend wireless cellular phone network coverage of an existing land-based cellular phone network to said area; and
- sending, by the computing device, a signal to a facility configured to deploy said one or more mobile cellular UAVs to said area according to said plan,
- wherein, responsive to said signal, said one or more mobile cellular UAVs are deployed to said area to connect with said existing land-based cellular phone network and extend cellular phone usage coverage at said area.

13. The method as claimed in claim 12, wherein said determining said predicted or actual increase in aggregate cellular phone usage demand includes:
- detecting one or more of: incoming signal strengths from mobile phone users received at a fixed land-based cellular phone tower associated with said area, or a number of dropped call events detected from a fixed land-based mobile cellular tower to other fixed land-based mobile cellular towers.

14. The method as claimed in claim 12, wherein said determining said predicted or actual increase in aggregate cellular phone usage demand includes:

monitoring said cellular phone network land-based fixed cellular phone tower bandwidth and calculating a metric using said monitored fixed cellular phone tower bandwidth divided by a number of registered users.

15. The method as claimed in claim 12, wherein said information includes data indicating a convergence or migration of many mobile phone users to said area at a current or future time, said data including one or more customer requests for increased coverage at said area for a specific time duration, wherein said identifying said area comprises detecting customer requests from one or more of: high profile users, very important customers or customers having a contract with a cellular phone network carrier, emergency responders, or personal calendar events shared voluntarily with a cellular phone network carrier.

16. The method as claimed in claim 12, wherein said information includes data indicating a convergence or migration of many mobile phone users to said area at a current or future time, said data comprising: transportation information including one or more of: data representing hired vehicle destination pick-up and drop-off locations, data representing current use of public transportation vehicles; data representing subway tickets sold to mobile phone users, wherein said determining said predicted or actual increase in aggregate cellular phone usage demand further comprises:
analyzing from said received transportation information a location where people are going and a rate of change to that location; and
detecting if a rate of change compared to threshold is achieved that indicates a significant number of people will move in that same direction.

17. The method as claimed in claim 12, wherein for predicting clustering, sad method further comprises:
detecting a destination of people movement; or
detecting a directional aspect of people movement; and
in response to a destination or directional aspect detecting, generating a further plan for deploying said one or more mobile cellular UAVs to a roaming pattern to accommodate said destination or directional aspect; and
sending signals to a facility to deploy and dispatch said one or more mobile cellular UAVs.

18. The method as claimed in claim 17, wherein signals are sent to a facility according to a plan to deploy and dispatch two or more mobile cellular unmanned aerial vehicles, said method further comprising:
detecting a merging of two or more group movements that provides a composite load to said area;
determining whether said two or more mobile cellular UAVs approach said area; and, one of:
sharing increased mobile cellular phone coverage by the two or more mobile cellular UAVs, or
determining whether one mobile cellular UAVs may handle the composite load.

19. The method as claimed in claim 17, wherein said data indicating a convergence or migration of many mobile phone users is based on received transportation information including one or more of: data representing received financial transaction information, said financial transactions data including one or more types of: credit, debit, cash, ATM withdrawals transactions, wherein to determine, said hardware processor is further configured to one or more of:
monitor for occurrence of an increased number of financial transactions of a particular transaction type;
determine if it is a type of transaction that implies said convergence or migration; and
determine for a trends or changes in velocity or rate of change of said as compared to a baseline measure; and
in response to a determined trend or change, generate said further plan for deploying said one or more mobile cellular UAVs to a roaming pattern to accommodate said destination or directional aspect.

20. The method as claimed in claim 12, wherein said information includes data indicating a convergence or migration of many mobile phone users to said area at a current or future time, said data indicating a convergence or migration of many mobile phone users is based on received social media information or conventional media information implying said convergence or migration, said social media network information data including: data from geo-tagged tweets or social media network messages from said user mobile devices, said predictive clustering of group movement being based on said geo-tagged tweets or said social media network messages.

21. The method as claimed in claim 12, wherein said deploying according to said plan comprises:
configuring an autonomic network of mobile cellular UAVs and sending signals to deploy one or more clusters of said mobile cellular UAVs network in a vicinity of or at the area;
detecting one or more events indicating a need for new or additional requirements;
updating said usage demand map based on said detected events; and
autonomically redeploying or regrouping one or more mobile cellular UAVs of a cluster to self correct said autonomic network based on said updated usage demand map.

22. The method as claimed in claim 21, wherein said autonomically redeploying or regrouping one or more mobile cellular UAVs of a cluster comprises:
establishing communication among each mobile cellular UAV and a designated leader in the cluster, each said UAV's communicating data according to said updated usage demand map;
monitoring that one or more mobile cellular UAVs of said cluster support a particular cell phone usage demand in said area or vicinity, and
self-correct a capacity of said cluster according to said updated usage demand map.

23. A computer program product for extending cellular phone coverage of a land-based cellular phone network, the computer program product comprising a non-transitory computer readable storage medium having program instructions embodied therewith, the program instructions readable by a processing circuit to cause the processing circuit to perform a method comprising:
receiving information for determining a predicted or actual increase in aggregate cellular phone usage demand in an area at a determined time, said information comprising data indicating a convergence or migration of many mobile phone users to said area;
predicting, using the hardware processor, a clustering of mobile device user group movement from said information indicating a convergence or migration;
generating, by the hardware processor, a usage demand map indicating the predictive clustering of said mobile device user group movement at said area, and identifying, using said usage demand map, a predicted or actual increased aggregate cellular phone usage demand for said area;

determining whether there exists a mismatch of existing usage coverage compared with said determined increased aggregate demand for said area;

determining, based on an identified mismatch, a plan for deploying one or more mobile cellular unmanned aerial vehicles (UAV) having telecommunications equipment configured to extend wireless cellular phone network coverage of an existing land-based cellular phone network to said area such that additional coverage is needed at the determined time; and sending, by the computing device, a signal to a facility configured to deploy said one or more mobile cellular UAVs to said area according to said plan, wherein, responsive to said signal, said one or more mobile cellular UAVs are deployed to said area to connect with said existing land-based cellular phone network and extend cellular phone usage coverage at said area.

24. The computer program product as claimed in claim 23, wherein said information includes data indicating a convergence or migration of many mobile phone users to said identified area at a current or future time, said method comprising:

predicting clustering of mobile device user group movement from said information; and generating a usage demand map indicating the predictive clustering of said mobile device user group movement at said area, and using said usage demand map is used to identify whether one or more other areas may need additional coverage during a time of the day.

25. The computer program product as claimed in claim 23, wherein to predict clustering, said method further comprises:

detecting a destination of people movement; or detecting a directional aspect of people movement; and in response to a destination or directional aspect detection, generating a further plan for deploying said one or more mobile cellular UAVs to a roaming pattern to accommodate said destination or directional aspect; and sending signals to a facility to deploy and dispatch said one or more mobile cellular UAVs.

* * * * *